United States Patent
Elshafie et al.

(10) Patent No.: US 12,484,039 B2
(45) Date of Patent: Nov. 25, 2025

(54) SOFT A/N REPORT TRIGGERING FOR SPS PDSCH

(71) Applicant: QUALCOMM Incorporated, San Diego, CA (US)

(72) Inventors: Ahmed Elshafie, San Diego, CA (US); Wei Yang, San Diego, CA (US); Yi Huang, San Diego, CA (US); Konstantinos Dimou, New York, NY (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 399 days.

(21) Appl. No.: 18/016,287

(22) PCT Filed: Aug. 30, 2021

(86) PCT No.: PCT/US2021/048255
§ 371 (c)(1),
(2) Date: Jan. 13, 2023

(87) PCT Pub. No.: WO2022/047317
PCT Pub. Date: Mar. 3, 2022

(65) Prior Publication Data
US 2023/0269720 A1    Aug. 24, 2023

(30) Foreign Application Priority Data
Aug. 31, 2020    (GR) .............................. 20200100528

(51) Int. Cl.
*H04W 72/11* (2023.01)
*H04L 1/1812* (2023.01)
(Continued)

(52) U.S. Cl.
CPC ........... *H04W 72/11* (2023.01); *H04L 1/1812* (2013.01); *H04L 5/0051* (2013.01); *H04W 72/1273* (2013.01); *H04W 72/54* (2023.01)

(58) Field of Classification Search
CPC . H04W 72/11; H04W 72/1273; H04W 72/54; H04L 1/1812; H04L 5/0051
See application file for complete search history.

(56) References Cited

U.S. PATENT DOCUMENTS

| 2019/0103946 A1 | 4/2019 | Li et al. |
| 2019/0261354 A1 | 8/2019 | Fakoorian et al. |

(Continued)

FOREIGN PATENT DOCUMENTS

| WO | 2017200879 A1 | 11/2017 |
| WO | 2019139985 A1 | 7/2019 |
| WO | 2020009986 A1 | 1/2020 |

OTHER PUBLICATIONS

International Search Report and Written Opinion—PCT/US2021/048255—ISA/EPO—Dec. 1, 2021.

(Continued)

*Primary Examiner* — Kevin C. Harper
*Assistant Examiner* — Salma Ayad
(74) *Attorney, Agent, or Firm* — Paul M. McAdams; Polsinelli LLP

(57) ABSTRACT

To provide hybrid automatic repeat request (HARQ) feedback transmission with channel state information (CSI) report, a UE may receive triggering information associated with transmitting one or more channel state information (CSI) reports associated with one or more downlink (DL) semi-persistent scheduling (SPS) transmissions in one or more physical downlink shared channel (PDSCH) occasions. The UE may receive a first DL SPS transmission of the one or more DL SPS transmissions in a first PDSCH occasion of the one or more PDSCH occasions. The UE may (Continued)

transmit a first CSI report associated with the first DL SPS transmission based on receiving the triggering information.

26 Claims, 15 Drawing Sheets

(51) Int. Cl.
*H04L 5/00* (2006.01)
*H04W 72/1273* (2023.01)
*H04W 72/54* (2023.01)

(56) References Cited

U.S. PATENT DOCUMENTS

| | | | |
|---|---|---|---|
| 2019/0394758 A1 | 12/2019 | Cheng et al. | |
| 2020/0112415 A1 | 4/2020 | Huang et al. | |
| 2020/0162134 A1* | 5/2020 | Kakishima | H04W 72/04 |
| 2021/0184817 A1* | 6/2021 | Nammi | H04L 5/0051 |
| 2021/0314105 A1* | 10/2021 | Gao | H04L 1/1812 |
| 2022/0360373 A1* | 11/2022 | Chen | H04L 1/1812 |
| 2023/0097142 A1* | 3/2023 | Alfarhan | H04B 17/318 |
| | | | 370/329 |

OTHER PUBLICATIONS

Qualcomm Incorporated: "Maintenance for CSI Reporting," R1-1803243, 3GPP TSG RAN WG1 Meeting #92, Feb. 26-Mar. 2, 2018, Athens, Greece, 12 pages, The Whole Document.

* cited by examiner

SOFT A/N REPORT TRIGGERING FOR SPS PDSCH

CROSS REFERENCE TO RELATED APPLICATION(S)

This application is a National Stage Application filed under 35 U.S.C. § 371 of PCT International Application Serial No. PCT/US2021/048255 entitled "SOFT A/N REPORT TRIGGERING FOR SPS PDSCH" and filed on Aug. 30, 2021, which claims the benefit of and priority to Greek Patent Application Serial No. 20200100528, entitled "DCI OR DMRS-DETECTION BASED SOFT A/N REPORT TRIGGERING FOR SPS PDSCH" and filed on Aug. 31, 2020, each of which is expressly incorporated by reference herein in its entirety.

TECHNICAL FIELD

The present disclosure relates generally to wireless communication, and more particularly, to triggering hybrid automatic repeat request (HARQ) feedback with channel state information (CSI) for downlink semi-persistent scheduling (SPS) transmissions.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new specifications associated with latency, reliability, security, scalability (such as with Internet of Things (IoT)), and other specifications. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

In some 5G NR communication systems, a user equipment (UE) may provide channel state information (CSI) reports in physical uplink shared channel (PUSCH). In order to receive more up-to-date CSI, a base station may trigger a UE's CSI reporting with a downlink (DL) grant. The UE may be triggered to provide a CSI report by transmitting in physical uplink control channel (PUCCH). However, for semi-persistent scheduling (SPS) transmissions, there may be no DL grant and the base station may not be able to trigger a UE's CSI reporting with a DL grant.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One innovative aspect of the subject matter described in this disclosure can be implemented in a method for wireless communication that improves CSI reporting for DL SPS transmissions which may in turn improve overall communication quality. The method includes receiving triggering information associated with transmitting one or more channel state information (CSI) reports associated with one or more downlink (DL) semi-persistent scheduling (SPS) transmissions in one or more physical downlink shared channel (PDSCH) occasions. The method further includes receiving a first DL SPS transmission of the one or more DL SPS transmissions in a first PDSCH occasion of the one or more PDSCH occasions. The method further includes transmitting a first CSI report associated with the first DL SPS transmission based on receiving the triggering information.

Another innovative aspect of the subject matter described in this disclosure can be implemented in a method for wireless communication. The method includes transmitting, to a user equipment (UE), triggering information associated with one or more CSI reports associated with a DL SPS transmission in one or more PDSCH occasions including a first PDSCH occasion. The method further includes receiving, from the UE based on the triggering information, a first CSI report in a physical uplink control channel (PUCCH).

To the accomplishment of the foregoing and related ends, the one or more aspects include the features hereinafter fully described and particularly pointed out in the claims. The following description and the annexed drawings provide illustrative features of the one or more aspects. These features are indicative, however, of but a few of the various ways in which the principles of various aspects may be employed, and this description is intended to include all such aspects and their equivalents.

DETAILED DESCRIPTION

Figure 1:
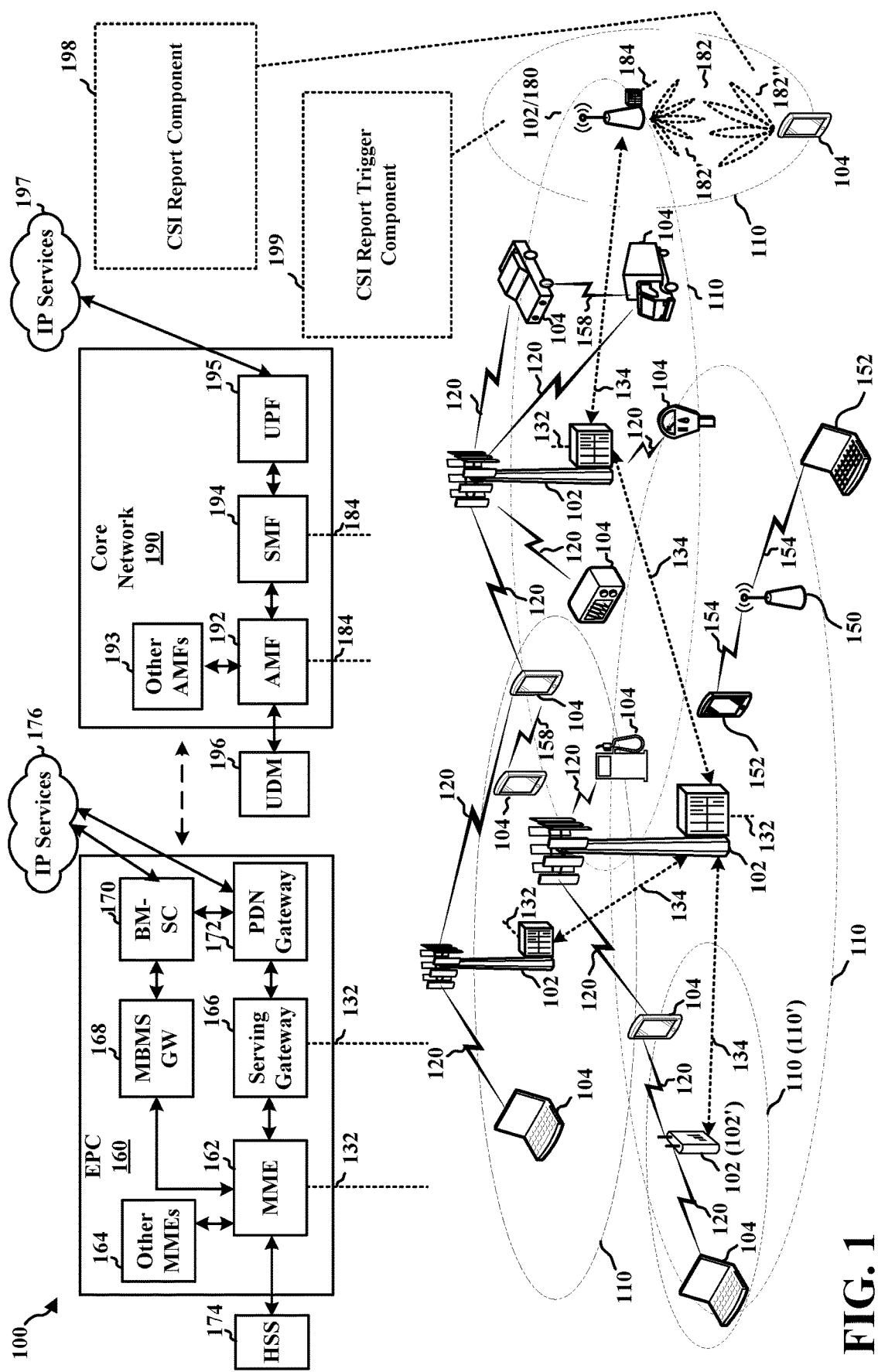
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to a person of ordinary skill in the art that these concepts may be practiced without these specific details. In some instances, structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software is to be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

While aspects and implementations are described in this application by illustration to some examples, a person of ordinary skill in the art will understand that additional implementations and use cases may come about in many different arrangements and scenarios. Aspects described herein may be implemented across many differing platform types, devices, systems, shapes, sizes, and packaging arrangements. For example, implementations or uses may come about via integrated chip implementations and other non-module-component based devices (such as end-user devices, vehicles, communication devices, computing devices, industrial equipment, retail/purchasing devices, medical devices, artificial intelligence (AI)-enabled devices, or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (such as hardware components including antenna, RF-chains, power amplifiers, modulators, buffer, processor (s), interleaver, adders/summers, or the like). It is intended that innovations described herein may be practiced in a wide variety of devices, chip-level components, systems, distributed arrangements, aggregated or disaggregated components, end-user devices, etc. of varying sizes, shapes, and constitution.

A base station may transmit a downlink grant to a user equipment (UE) in order to indicate to the UE to provide a channel state information (CSI) report to the base station. In some examples, the base station may transmit a wireless communication, such as a semi-persistent scheduling (SP S) communication, without a downlink grant for each physical downlink shared channel (PDSCH) occasion However, for SPS transmissions, there may be no DL grant and the base station may not be able to trigger a UE's CSI reporting with a DL grant.

Aspects presented herein enable a base station to trigger hybrid automatic repeat request (HARQ) feedback with CSI for downlink SPS transmissions. In some aspects, a UE may receive, from the base station, triggering information for transmitting a CSI report associated with a DL SPS transmission in a PDSCH and may transmit the CSI report based on the received trigger. The triggering information may be a defined demodulation reference signal (DM-RS) or downlink control information (DCI). For example, a defined DM-RS sequence, a DCI, or a defined field within the DCI may trigger a UE to transmit a CSI report. If the UE receives the triggering information from the base station, the UE may transmit the HARQ feedback for the downlink SPS transmission along with the CSI report. If the UE does not receive the triggering information from the base station, the UE may transmit the HARQ feedback for the downlink SPS transmission without a CSI report.

Particular implementations of the subject matter described in this disclosure can be implemented to realize one or more of the following potential advantages. In some aspects, the disclosed techniques enable a base station to trigger the UE to provide more up-to-date CSI information for SPS transmissions while also conserving network resources by not transmitting a DL grant. With more up-to-date CSI information, the base station may change configurations and select transmission parameters that are better-suited for the current channel, which may in turn improve physical uplink shared channel (PUSCH) communications and overall communication quality between the UE and the base station.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (such as a S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over third backhaul links 134 (such as an X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (IMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, such as in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same unlicensed frequency spectrum (such as 5 GHz, or the like) as used by the Wi-Fi AP 150. The small cell 102', employing NR in an unlicensed frequency spectrum, may boost coverage to or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. Higher frequency bands may also be explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR4-a or FR4-1, or FR5, or may be within the EHF band.

A base station 102, whether a small cell 102' or a large cell (for example a macro base station), may include or be referred to as an eNB, gNodeB (gNB), or another type of base station. Some base stations, such as gNB 180 may operate in a traditional sub 6 GHz spectrum, in millimeter wave frequencies, or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as a MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, the UE 104 includes an CSI report component 199. The CSI report component 199 may be configured to receive triggering information associated with transmitting one or more CSI reports associated with one or more DL SPS transmissions in one or more PDSCH occasions. The CSI report component 199 may be configured to receive a first DL SPS transmission of the one or more DL SPS transmissions in a first PDSCH occasion of the one or more PDSCH occasions and transmit a first CSI report associated with the first DL SPS transmission based on receiving the triggering information. The base station 102/180 includes an CSI report trigger component 198. The CSI report trigger component 198 may be configured to transmit, to a UE, triggering information associated with one or more CSI reports associated with one or more DL SPS transmissions in one or more PDSCH occasions including a first PDSCH occasion. The CSI report trigger component 198 may be configured to receive, from the UE based on the triggering information, a first CSI report in a physical uplink control channel (PUCCH).

Although the following description may be focused on 5GNR, the concepts described herein may be applicable to other similar areas, such as LTE, LTE-A, CDMA, GSM, and other wireless technologies.

Figure 2:
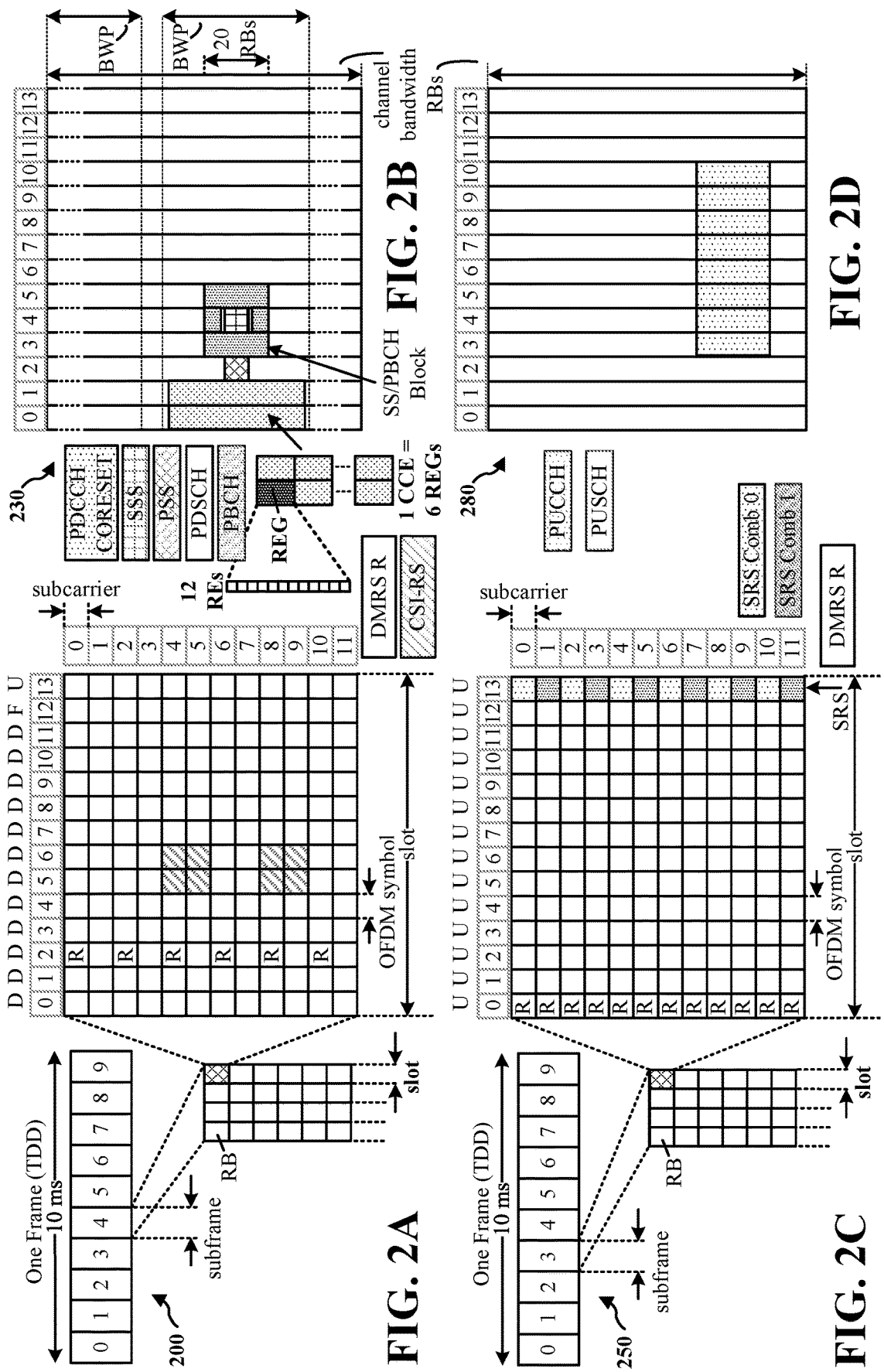
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description provided herein applies also to a 5G NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 29 slots/subframe. The subcarrier spacing and symbol length/duration are a function of the numerology. The subcarrier spacing may be equal to $2^{\mu}*15$ kHz, where y is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (for example, 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (for example common search space, UE-specific search space) during PDCCH monitoring occasions on the CORESET, where the PDCCH candidates have different DCI formats and different aggregation levels. Additional BWPs may be located at greater or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The PDSCH carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the PUCCH and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PI), a rank indicator (RI), and hybrid automatic repeat request (HARQ) acknowledgment (ACK) or negative ACK (NACK) feedback. The PUSCH carries data, and may additionally be used to carry a buffer status report (BSR), a power headroom report (PHR), or UCI.

Figure 3:
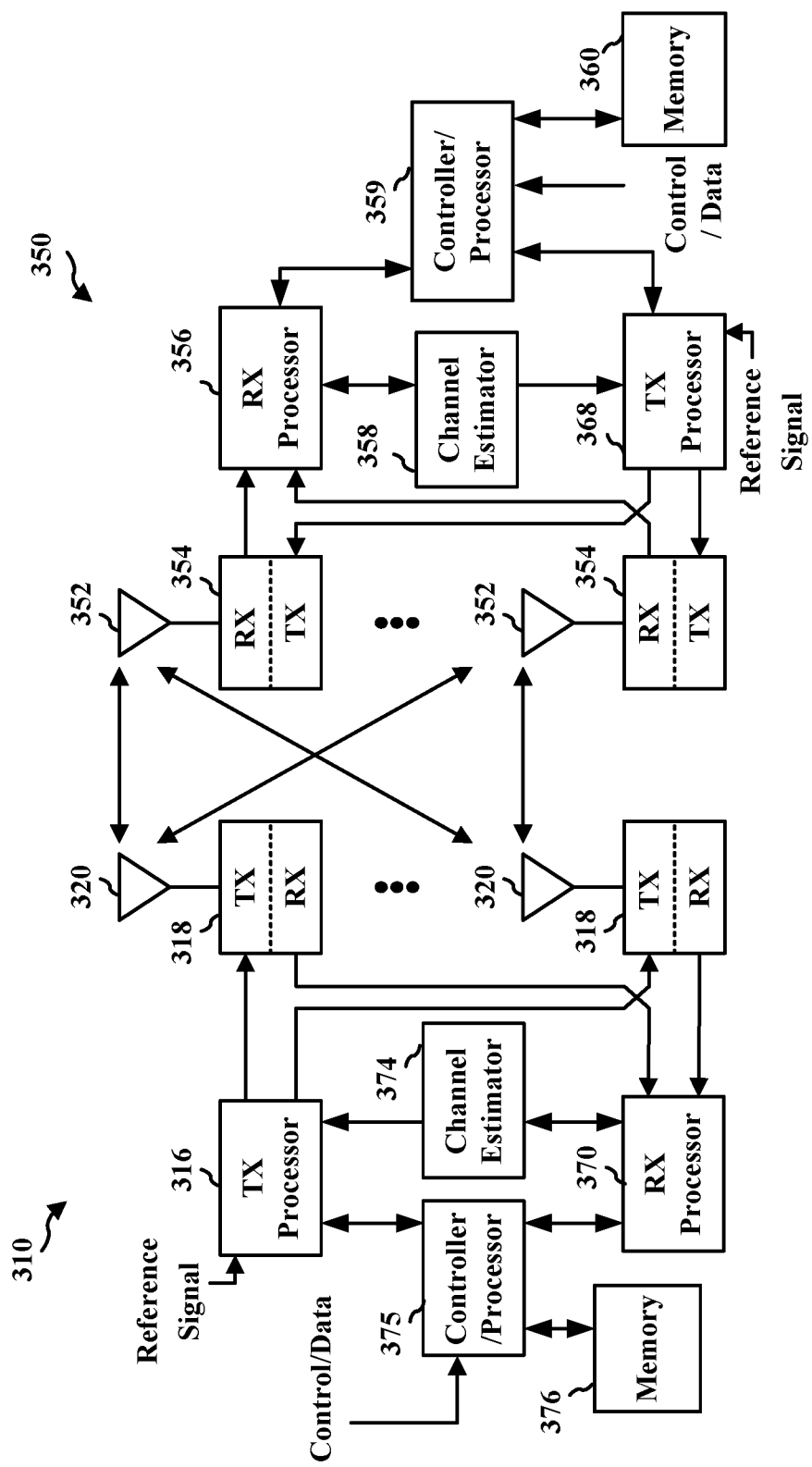
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (for example a MIB, SIBs), RRC connection control (for example RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (for example, binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/ processor 359 provides RRC layer functionality associated with system information (such as MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 316, the RX processor 370, and the controller/processor 375 may be configured to perform aspects in connection with CSI report trigger component 198 of FIG. 1.

At least one of the TX processor 368, the RX processor 356, and the controller/processor 359 may be configured to perform aspects in connection with CSI report component 199 of FIG. 1.

Figure 4:
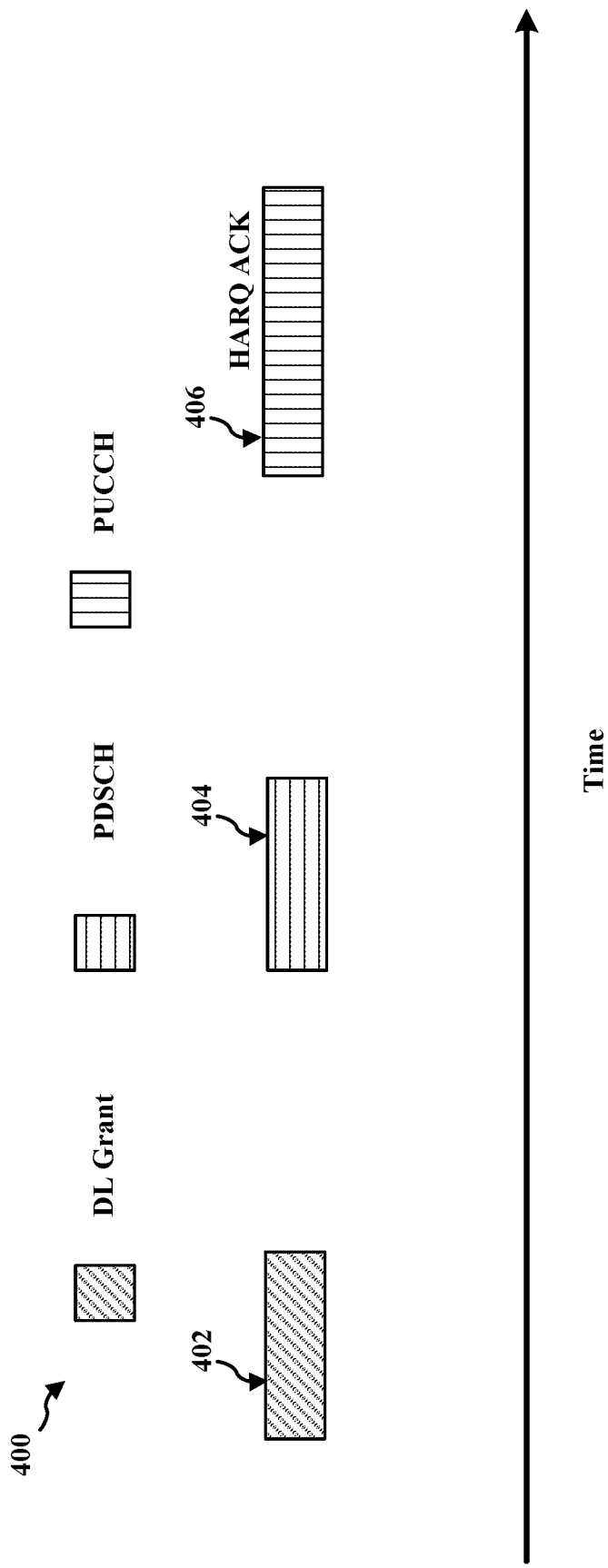
FIG. 4 illustrates example channel state information (CSI) triggered by DL grant on physical uplink control channel (PUCCH).
Figure 5:
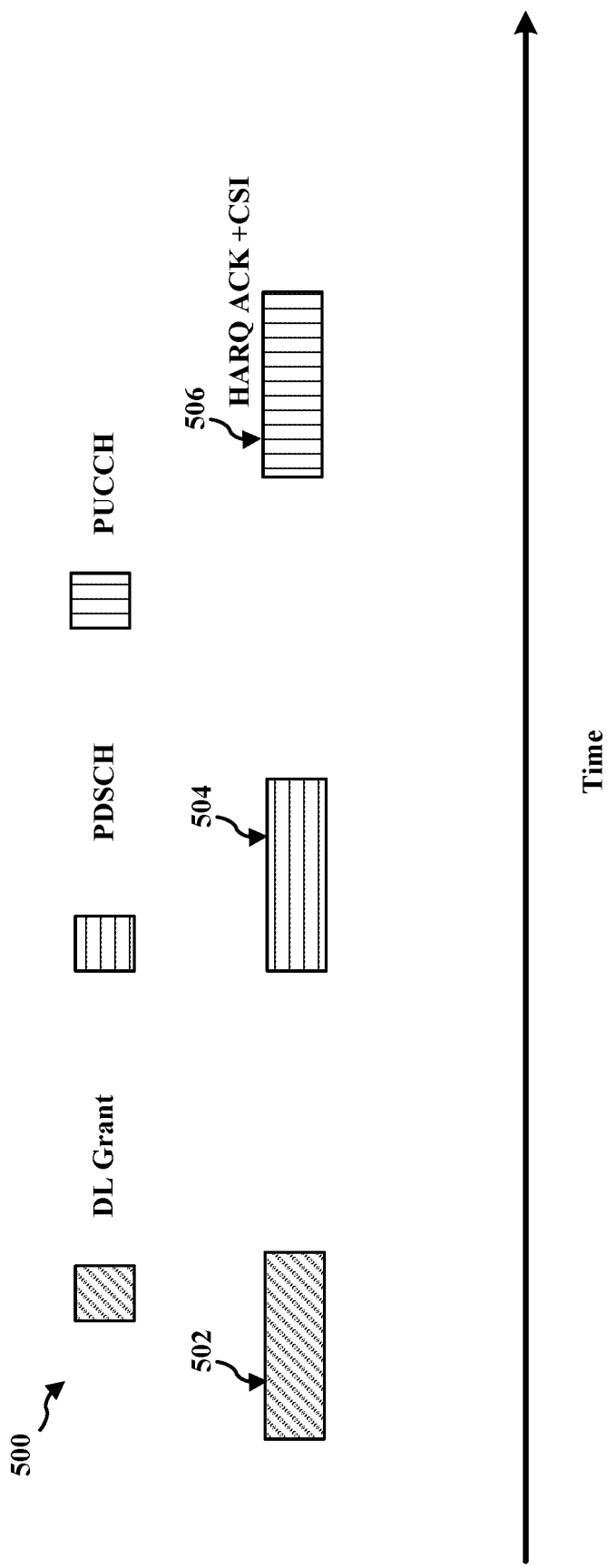
FIG. 5 illustrates example CSI triggered by DL grant on PUCCH.

In some wireless communication systems, a base station may schedule a UE to transmit an CSI report on a PUSCH using an UL grant. The base station may also use a DL grant to trigger a CSI report on a PUCCH. The CSI report on the PUCCH may enable faster CSI reporting than CSI reporting on the PUSCH, such as to provide the base station with more up-to-date CSI information, which in turn may improve PUSCH performance, such as through a reduced latency or increased reliability. FIGS. 4 and 5 illustrate examples of CSI triggered by a DL grant on a PUCCH in accordance with various aspects of the present disclosure. As illustrated in in example 400 in FIG. 4, a base station may transmit a DL grant 402 associated with a PDSCH 404 to a UE. In response to receiving the DL grant 402 associated with the PDSCH 404, the UE may transmit a HARQ feedback message (such as a HARQ-ACK) in a PUCCH resource 406. Alternatively, as illustrated in example 500 in FIG. 5, a base station may transmit a DL grant 502 associated with a PDSCH 504 to a UE. In response to receiving the DL grant 502, the UE may transmit a HARQ feedback message (such as a HARQ-ACK) and CSI in a same PUCCH resource 506. The HARQ feedback message and the associated CSI transmitted in the same PUCCH resource 506 may be referred as a "soft HARQ feedback message".

For DL SPS (which may be otherwise referred as grant-free scheduling), there may be no DL grant. Because there may be no DL grant, the base station may not use a DL grant to trigger a CSI report with HARQ feedback. Mechanisms for triggering CSI report with HARQ feedback for DL SPS are provided herein. In some aspects, a UE may receive a trigger to transmit CSI report associated with DL SPS transmission in PDSCH and may transmit the CSI report based on the received trigger. The trigger may be a DM-RS or a DCI. By utilizing such mechanisms for DL SPS, more up-to-date CSI information may be provided to a base station which may in turn improve PUSCH and overall communication quality between the UE and the base station.

Figure 6:
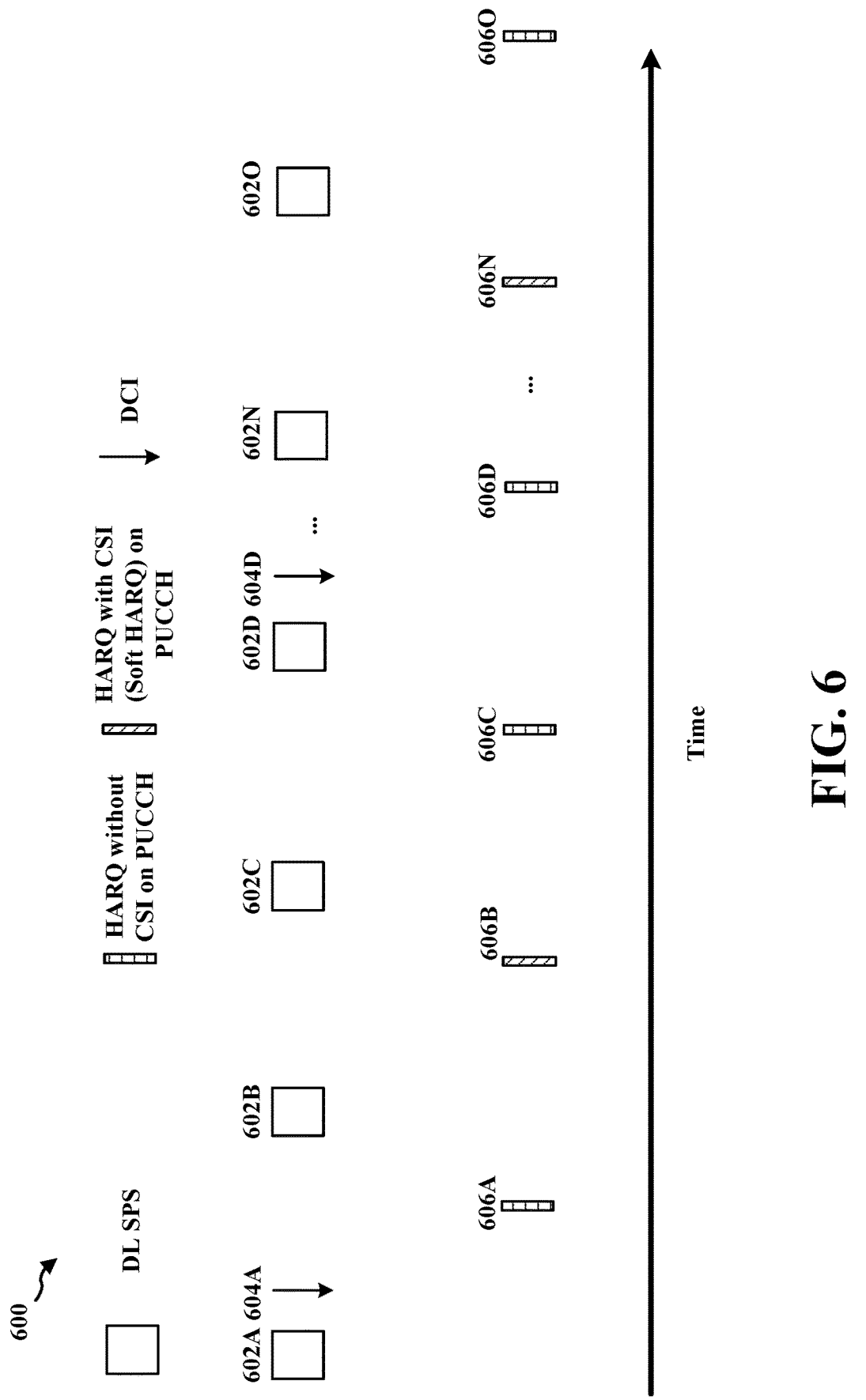
FIG. 6 illustrates example CSI for DL semi-persistent scheduling (SPS) transmission on PUCCH in accordance with various aspects of the present disclosure.

As illustrated in in example 600 in FIG. 6, a base station may periodically transmit DL SPS transmissions 602A, 602B, 602C, 602D, . . . , 602N, and 602O to a UE. The periodicity of the DL SPS transmission may be transmitted to and configured for the UE in RRC transmissions. The base station may transmit a DCI to trigger CSI reporting for the UE. In some aspects, the DCI itself may be the trigger. In some aspects, the DCI may include the trigger. For example, after a UE receives a DCI 604A that triggers CSI report with a HARQ feedback message (which may be referred to as soft HARQ feedback message), the UE may transmit a CSI report for a next DL SPS transmission 602B on a PUCCH resource 606B. Similarly, after a UE receives a DCI 604D that triggers CSI report with a HARQ feedback message (for example, a soft HARQ feedback message), the UE may transmit a CSI report for a next DL SPS transmission 602N on a PUCCH resource 606N. Without the DCI that triggers CSI reporting, the UE may transmit a HARQ feedback message without a CSI report upon receiving the DL SPS transmissions 602A, 602C, 602D, and 602O in PUCCH resources 606A, 606C, 606D, and 606O. The CSI report may include a channel quality information (CQI), a modulation and coding scheme (MCS), a block error ratio (BLER), a bit error rate (BER), or a next best redundancy version (RV), a channel rank, or an average received power. In some aspects, the CSI report may be generated based on one or more of aDM-RS or aPDSCH. In some aspects, the trigger may trigger CSI report regardless of whether HARQ feedback message would be transmitted.

Figure 7:
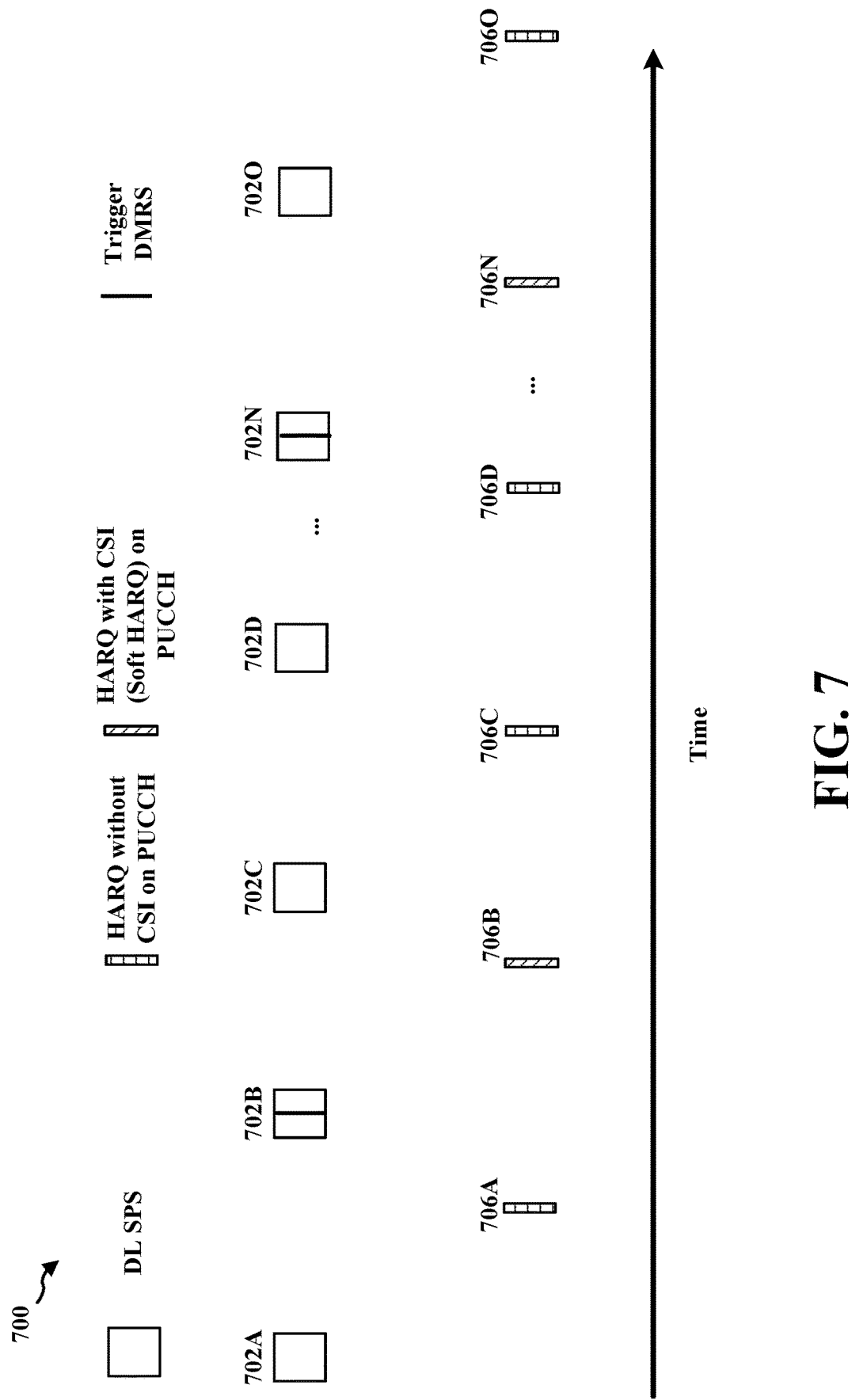
FIG. 7 illustrates example CSI for DL SPS transmission on PUCCH in accordance with various aspects of the present disclosure.

In some aspects, the trigger may be a DM-RS instead of a DCI. As illustrated in in example 700 in FIG. 7, a base station may periodically transmit DL SPS transmissions 702A, 702B, 702C, 702D, . . . , 702N, and 702O to a UE. The base station may transmit a trigger DM-RS to trigger CSI reporting for the UE. In some aspects, the trigger DM-RS may be a DM-RS of a different sequence compared to other nominal DM-RS, such as an even or odd element sign flipped DMRS that flips sign of even or odd numbered elements. The base station may include the trigger-DMRS in DL SPS transmission to trigger CSI reporting for the UE. For example, after a UE receives a trigger DM-RS that triggers CSI report with a HARQ feedback message (for example, soft HARQ feedback message) in the DL SPS transmission 602B, the UE may transmit a CSI report on a PUCCH resource 706B associated with the DL SPS transmission 702B. Similarly, after a UE receives a trigger DM-RS that triggers CSI report with a HARQ feedback message (for example, soft HARQ feedback message) in the DL SPS transmission 702N, the UE may transmit a CSI report on a PUCCH resource 706N associated with the DL SPS transmission 702B. Without the trigger DM-RS that triggers CSI reporting, the UE may transmit a HARQ feedback message without a CSI report upon receiving the DL SPS transmissions 702A, 702C, 702D, and 702O in PUCCH resources 706A, 706C, 706D, and 706O. The DL SPS transmissions 702A, 702C, 702D, and 702O may each include a DM-RS that is not the trigger DM-RS.

Figure 8:
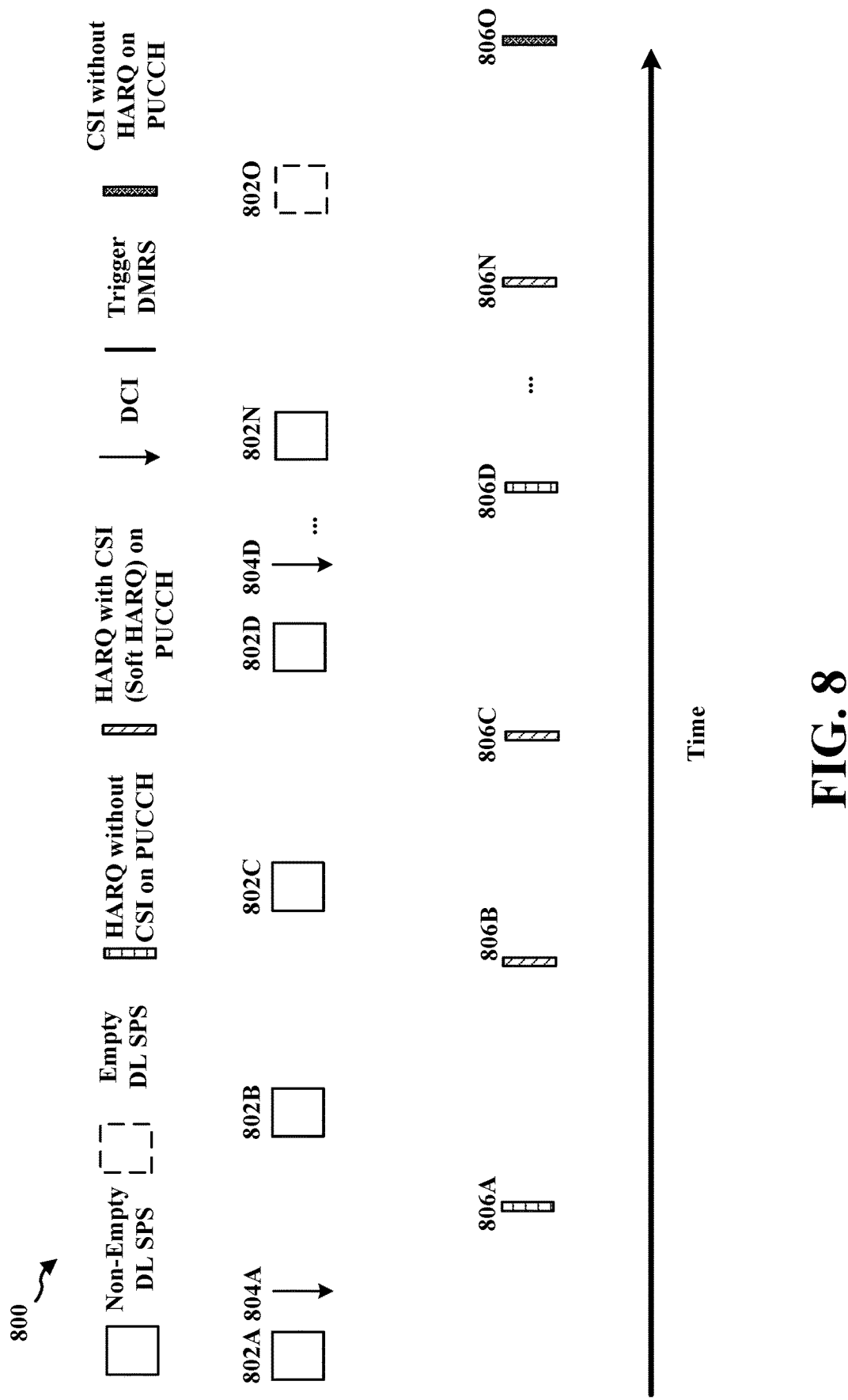
FIG. 8 illustrates example CSI for DL SPS transmission on PUCCH in accordance with various aspects of the present disclosure.

In some aspects, the trigger may trigger CSI reporting for the UE for one DL SPS transmissions as illustrated in example 600 and 700. In some aspects, the trigger may trigger CSI reporting for the UE for a configured number of DL SPS transmissions. As illustrated in in example 800 in FIG. 8, a base station may periodically transmit DL SPS transmissions 802A, 802B, 802C, 802D, . . . , 802N, and 802O to a UE. The base station may transmit a DCI to trigger CSI reporting for a configured number (for example, 2) of DL SPS transmissions for the UE. The configured number may be configured via radio resource control (RRC) signaling, a medium access control (MAC) control element (MAC-CE), or DCI.

After a UE receives a DCI 804A that triggers CSI report, the UE may transmit CSI reports for next two DL SPS transmissions 802B and 802C on PUCCH resources 806B and 806C. Similarly, after a UE receives a DCI 804D that triggers CSI report with a HARQ feedback message (for example, soft HARQ feedback message), the UE may transmit a CSI report for next two DL SPS transmissions 802N and 802O on PUCCH resources 806N and 806O. Without the DCI that triggers CSI reporting, the UE may transmit a HARQ feedback message without a CSI report upon receiving the DL SPS transmissions 802A, 802D, and 802O in PUCCH resources 806A, 806D, and 806O. In some aspects, the trigger may trigger CSI reporting without a HARQ feedback message. For example, the scheduled DL SPS transmission 802O may be an empty DL SPS transmission where the base station decided to not transmit data in the DL SPS transmission 802O. Because the UE received trigger DCI 804D that triggers CSI reporting for DL SPS transmission 802O, the UE may transmit a CSI report on PUCCH 806O without transmitting HARQ feedback message on PUCCH 806O.

Figure 9:
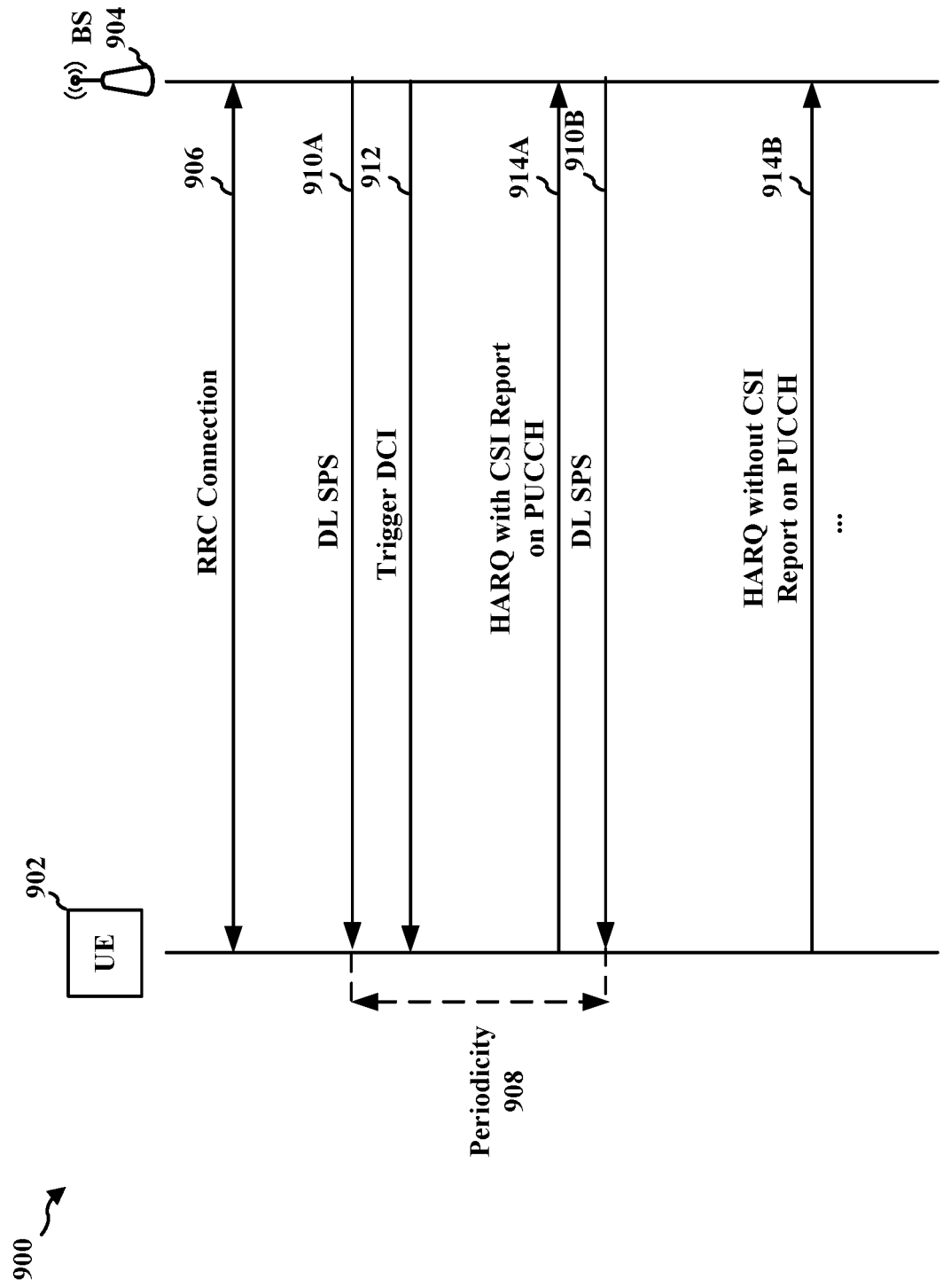
FIG. 9 illustrates an example communication flow between a base station and a UE in accordance with various aspects of the present disclosure.

FIG. 9 illustrates an example communication flow 900 between a base station 904 and a UE 902. As illustrated in FIG. 9, the UE 902 and the base station 904 may establish RRC connection 906. The base station 904 may configure the UE 902 with a periodicity of DL SPS transmission via RRC connection 906. After the RRC connection 906, the base station 904 may start periodically transmitting DL SPS transmissions 910A, 910B, or the like, in accordance with a configured periodicity 908 to the UE 902. After detecting a trigger DCI 912 associated with the DL SPS transmission 910A or detecting a trigger DM-RS included in the DL SPS transmission 910A, the UE 902 may generate a CSI report and transmit a HARQ feedback message with the CSI report on PUCCH 914A. In some aspects, the DL SPS transmission 910B may not be associated with a trigger (for example, a DCI or a trigger DM-RS). The UE 902 may transmit a HARQ feedback message 914B without a CSI report on a PUCCH upon receiving the DL SPS transmission 910B. In some aspects, the trigger DCI 912 may trigger the soft report (the HARQ feedback message with the CSI report on PUCCH 914A) if the trigger DCI 912 is received Z symbols, slots, or mini-slots before the PUCCH resource (PUCCH 914A) scheduled to send HARQ-ACK/CSI feedback of the PDSCH occasion in the DL SPS transmission 910A. Z may be an positive integer.

Figure 10:
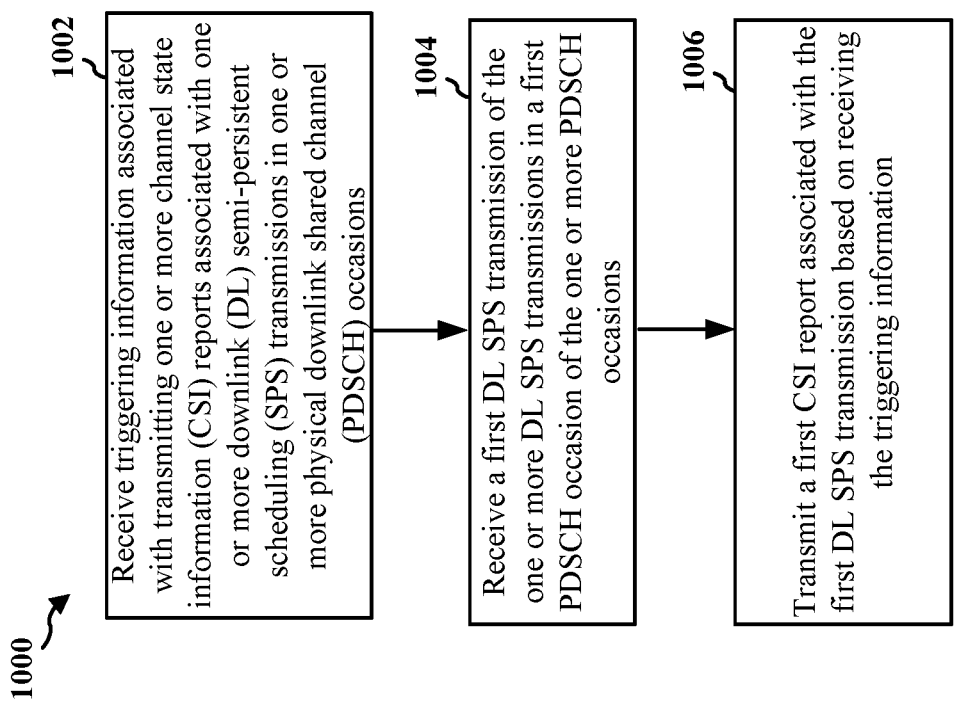
FIG. 10 is a flowchart of a method of wireless communication at a UE that supports DCI or demodulation reference signal (DM-RS) triggered CSI reporting in accordance with various aspects of the present disclosure.

FIG. 10 is a flowchart 1000 of a method of wireless communication at a UE that supports DCI or DM-RS triggered CSI reporting in accordance with various aspects of the present disclosure. The method may be performed by a UE such as the UE 104, the UE 902, the apparatus 1402, or the like.

At 1002, the UE may receive triggering information associated with transmitting one or more CSI reports associated with one or more DL SPS transmissions in PDSCH occasions from a base station. In some aspects, the reception at 1002 may be performed by triggering component 1442 of FIG. 14. In some aspects, the triggering information may correspond to the DCI 604A/604D in FIG. 6, the DM-RS in DL SPS 702B/702N in FIG. 7, the DCI 804A/804D in FIG. 8, the trigger DCI 912 or the DM-RS in the DL SPS 910A in FIG. 9, or the like. In some aspects, the one or more DL SPS transmissions to DL SPS transmission 602B/602N in FIG. 6, the DL SPS transmission 702B/702N in FIG. 7, the DL SPS 802B/802C/802N/802O in FIG. 8, the DL SPS transmission 910A, or the like. In some aspects, the first PDSCH occasion may correspond to the DL SPS transmission 602B/602N in FIG. 6, the DL SPS transmission 702B/702N in FIG. 7, the DL SPS transmission 802B/802N in FIG. 8, the DL SPS transmission 910A, or the like. In some aspects, the UE may receive a second DL SPS transmission in a second PDSCH occasion that is not associated with the triggering information. For example, the second DL SPS transmission may correspond to the DL SPS transmission 602A/602C/602D/602O in FIG. 6, the DL SPS transmission 702A/702C/702D/702O in FIG. 7, the DL SPS transmission 802A/802D in FIG. 8, the DL SPS transmission 910B in FIG. 9, or the like.

In some aspects, the first PDSCH occasion includes a first DM-RS and receiving the triggering information may include receiving the first DM-RS. The first DM-RS may trigger the UE to transmit the CSI report. For example, the DL SPS transmission 702B and 702N in FIG. 7 may correspond to the first PDSCH occasion that includes the DM-RS. In some aspects, the first DM-RS is a first type of DM-RS and the second PDSCH occasion includes a second DM-RS that is a second type of DM-RS different than the first type of DM-RS. For example, the trigger DM-RS in the DL SPS transmission 702B and 702N in FIG. 7 may correspond to the first DM-RS and the DM-RS in the DL SPS transmission 702A may correspond to the second DM-RS. In some aspects, the first type of DM-RS corresponds to a first DM-RS sequence and the second type of DM-RS corresponds to a second DM-RS sequence different than the first DM-RS sequence. In some aspects, each of the even-numbered elements in the first DM-RS sequence has an opposite sign relative to the respective even-numbered element in the second DM-RS sequence or each of the odd-numbered elements in the first DM-RS sequence has an opposite sign relative to the respective odd-numbered element in the second DM-RS sequence. In some aspects, the first type of DM-RS corresponds to a first DM-RS sequence and the second type of DM-RS corresponds to a second DM-RS sequence, the first DM-RS sequence being different from the second DM-RS sequence. In some aspects, the first type of DM-RS may correspond to a first DM-RS pattern or a first DM-RS configuration and the second type of DM-RS corresponds to a second DM-RS pattern or a second DM-RS configuration. The first DM-RS pattern or the first DM-RS configuration may be different from the second DM-RS pattern or the second DM-RS configuration. The first DM-RS configuration and the second DM-RS configuration may correspond to at least one of a DM-RS location, a DM-RS allocation in time or frequency resources, a DM-RS scrambling ID, or a number of DM-RS symbols.

In some aspects, the first PDSCH occasion is associated with a DCI. Receiving the triggering information may include receiving the DCI. The DCI may be triggering the UE to transmit the first CSI report or includes the trigger. For example, the first PDSCH occasion may correspond to the DL SPS transmission 602B/602N in FIG. 6 and the DCI may correspond to the DCI 604A/604D in FIG. 6. In some aspects, the triggering information activates the UE to transmit the first CSI report for one PDSCH occasion after the received PDSCH. In some aspects, the triggering information activates the UE to transmit the CSI report for Each of X received PDSCH occasions including the first PDSCH occasion, where X≥1 and is configured via RRC, MAC-CE, or DCI.

At 1004, the UE may receive a first DL SPS transmission of the one or more DL SPS transmissions in a first PDSCH occasion of the one or more PDSCH occasions. In some aspects, the receiving at 1004 may be performed by SPS component 1444 of FIG. 14. In some aspects, the first DL SPS transmission may be received. In some aspects, the first DL SPS transmission may not be received. For example, as illustrated in the DL SPS transmission 8020 in FIG. 8, the DL SPS transmission may be empty and not received by the UE.

At 1006, the UE may transmit the first CSI report associated with the first DL SPS transmission based on receiving the triggering information. In some aspects, the transmission 1006 may be performed by CSI component 1446 of FIG. 14. In some aspects, the UE may generate the CSI report based on one or more of the PDSCH or a DM-RS. In some aspects, the CSI report includes one or more of a CQI, a MCS, a BLER, a BER, a next best RV, a channel rank, or an average received power. In some aspects, the CSI report may include a delta MCS or a reference MCS. A delta MCS may be a measured MCS minus scheduled MCS (e.g., MCS used for the PDSCH occasion transmission). A reference MCS may be the scheduled MCS. In some aspects, the UE may further transmit a first HARQ feedback message including an ACK or an NACK based on receiving the first DL SPS transmission. The first CSI report and the HARQ feedback message may be transmitted in a same PUCCH. The HARQ feedback message based on receiving the first DL SPS transmission may correspond to the HARQ feedback message in the HARQ with CSI report on the PUCCH 606B/606N in FIG. 6, the HARQ message feedback in the HARQ with CSI report on the PUCCH 706B/706N in FIG. 7, the HARQ feedback message in the HARQ with CSI report on the PUCCH 806B/806C/806N in FIG. 8, the HARQ feedback message in the HARQ with CSI report on PUCCH 914A in FIG. 9 or the like. In some aspects, the UE may further receive a second DL SPS transmission in a second PDSCH occasion that is not associated with the triggering information and transmit. The UE may further transmit a second HARQ feedback message, based on receiving the second DL SPS transmission, without transmitting a CSI report associated with the second DL SPS transmission based on the triggering information not being associated with the second DL SPS transmission in the second PDSCH occasion. The second HARQ feedback message without the CSI report may correspond to the HARQ feedback message in 606A/606C/606D/6060 in FIG. 6, the HARQ feedback message in 706A/706C/706D/7060 in FIG. 7, the HARQ feedback message in 806A/806C/806D/8060 in FIG. 8, the HARQ feedback message in 914B in FIG. 9, or the like.

Figure 11:
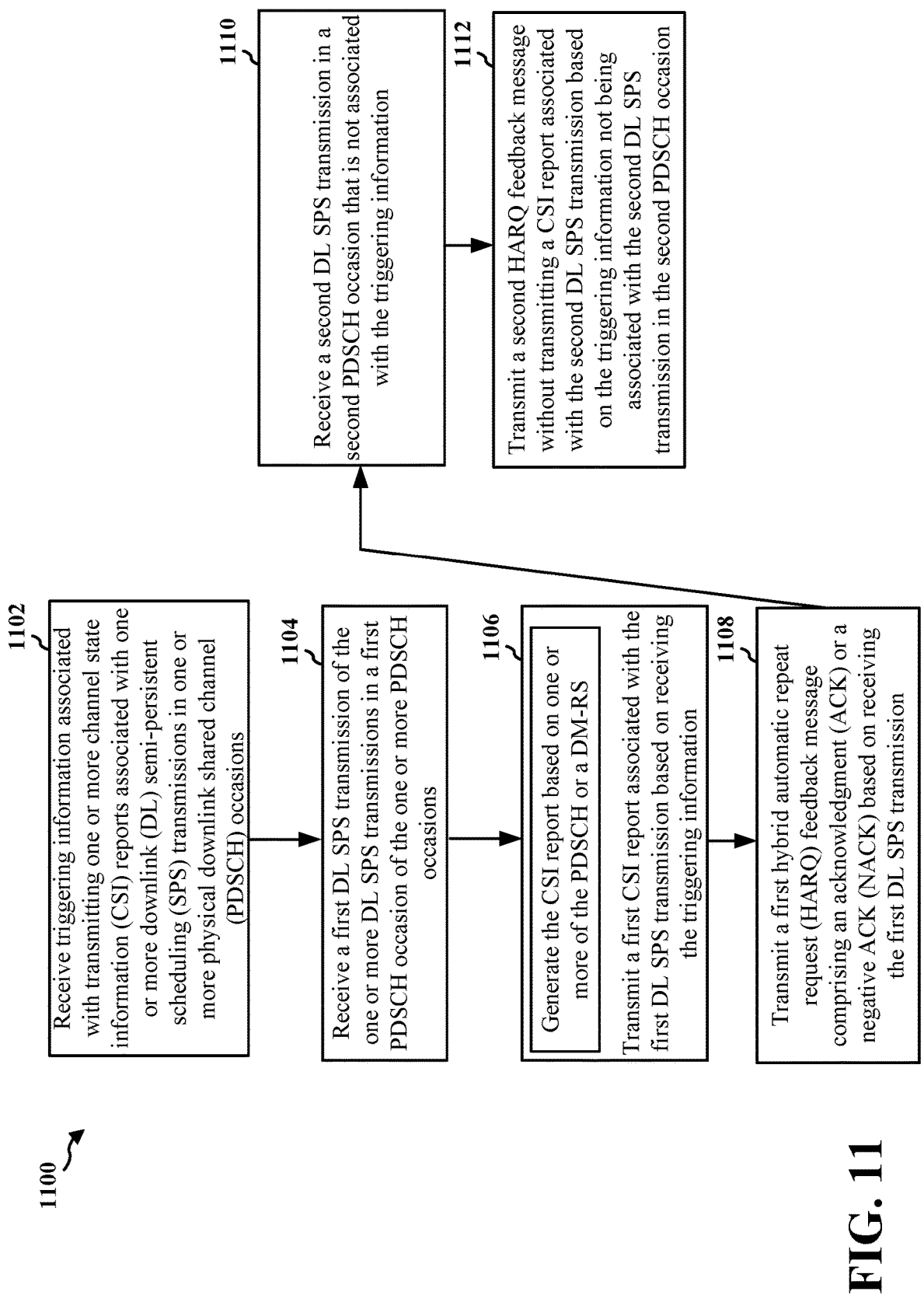
FIG. 11 is another flowchart of a method of wireless communication at a UE that supports DCI or demodulation reference signal (DM-RS) triggered CSI reporting in accordance with various aspects of the present disclosure.

FIG. 11 is a flowchart 1100 of a method of wireless communication at a UE that supports DCI or DM-RS triggered CSI reporting in accordance with various aspects of the present disclosure. The method may be performed by a UE such as the UE 104, the UE 902, the apparatus 1402, or the like.

At 1102, the UE may receive triggering information associated with transmitting one or more CSI reports associated with one or more DL SPS transmissions in PDSCH occasions from a base station. In some aspects, the reception at 1102 may be performed by triggering component 1442 of FIG. 14. In some aspects, the triggering information may correspond to the DCI 604A/604D in FIG. 6, the DM-RS in DL SPS 702B/702N in FIG. 7, the DCI 804A/804D in FIG. 8, the trigger DCI 912 or the DM-RS in the DL SPS 910A in FIG. 9, or the like. In some aspects, the one or more DL SPS transmissions to DL SPS transmission 602B/602N in FIG. 6, the DL SPS transmission 702B/702N in FIG. 7, the DL SPS 802B/802C/802N/8020 in FIG. 8, the DL SPS transmission 910A, or the like. In some aspects, the first PDSCH occasion may correspond to the DL SP S transmission 602B/602N in FIG. 6, the DL SPS transmission 702B/702N in FIG. 7, the DL SPS transmission 802B/802N in FIG. 8, the DL SPS transmission 910A, or the like. In some aspects, the UE may receive a second DL SPS transmission in a second PDSCH occasion that is not associated with the triggering information. For example, the second DL SPS transmission may correspond to the DL SPS transmission 602A/602C/602D/6020 in FIG. 6, the DL SPS transmission 702A/702C/702D/702O in FIG. 7, the DL SPS transmission 802A/802D in FIG. 8, the DL SPS transmission 910B in FIG. 9, or the like.

In some aspects, the first PDSCH occasion includes a first DM-RS and receiving the triggering information may include receiving the first DM-RS. The first DM-RS may trigger the UE to transmit the CSI report. For example, the DL SPS transmission 702B and 702N in FIG. 7 may correspond to the first PDSCH occasion that includes the DM-RS. In some aspects, the first DM-RS is a first type of DM-RS and the second PDSCH occasion includes a second DM-RS that is a second type of DM-RS different than the first type of DM-RS. For example, the trigger DM-RS in the DL SPS transmission 702B and 702N in FIG. 7 may correspond to the first DM-RS and the DM-RS in the DL SPS transmission 702A may correspond to the second DM-RS. In some aspects, the first type of DM-RS corresponds to a first DM-RS sequence and the second type of DM-RS corresponds to a second DM-RS sequence different than the first DM-RS sequence. In some aspects, each of the even-numbered elements in the first DM-RS sequence has an opposite sign relative to the respective even-numbered element in the second DM-RS sequence or each of the odd-numbered elements in the first DM-RS sequence has an opposite sign relative to the respective odd-numbered element in the second DM-RS sequence. In some aspects, the first type of DM-RS corresponds to a first DM-RS sequence and the second type of DM-RS corresponds to a second DM-RS sequence, the first DM-RS sequence being different from the second DM-RS sequence. In some aspects, the first type of DM-RS may correspond to a first DM-RS pattern or a first DM-RS configuration and the second type of DM-RS corresponds to a second DM-RS pattern or a second DM-RS configuration. The first DM-RS pattern or the first DM-RS configuration may be different from the second DM-RS pattern or the second DM-RS configuration. The first DM- RS configuration and the second DM-RS configuration may correspond to at least one of a DM-RS location, a DM-RS allocation in time or frequency resources, a DM-RS scrambling ID, or a number of DM-RS symbols.

In some aspects, the first PDSCH occasion is associated with a DCI. Receiving the triggering information may include receiving the DCI. The DCI may be triggering the UE to transmit the CSI report or includes the trigger. For example, the first PDSCH occasion may correspond to the DL SPS transmission 602B/602N in FIG. 6 and the DCI may correspond to the DCI 604A/604D in FIG. 6. In some aspects, the triggering information activates the UE to transmit the CSI report for one PDSCH occasion after the received PDSCH. In some aspects, the triggering information activates the UE to transmit the CSI report for Each of X received PDSCH occasions including the first PDSCH occasion, where X≥1 and is configured via RRC, MAC-CE, or DCI.

At 1104, the UE may receive a first DL SPS transmission of the one or more DL SPS transmissions in a first PDSCH occasion of the one or more PDSCH occasions. In some aspects, the receiving at 1104 may be performed by SPS component 1444 of FIG. 14. In some aspects, the first DL SPS transmission may be received. In some aspects, the first DL SPS transmission may not be received. For example, as illustrated in the DL SPS transmission 8020 in FIG. 8, the DL SPS transmission may be empty and not received by the UE.

At 1106, the UE may transmit the first CSI report associated with the first DL SPS transmission based on receiving the triggering information. In some aspects, the transmission 1106 may be performed by CSI component 1446 of FIG. 14. In some aspects, as part of 1106, the UE may generate the CSI report based on one or more of the PDSCH or a DM-RS. In some aspects, the CSI report includes one or more of a CQI, a MCS, a BLER, a BER, a next best RV, a channel rank, or an average received power. In some aspects, the CSI report may include a delta MCS or a reference MCS. A delta MCS may be a measured MCS minus scheduled MCS (e.g., MCS used for the PDSCH occasion transmission). A reference MCS may be the scheduled MCS. In some aspects, at 1108, the UE may further transmit a first HARQ feedback message including an ACK or an NACK based on receiving the first DL SPS transmission. The first CSI report and the HARQ feedback message may be transmitted in a same PUCCH. In some aspects, the transmission at 1108 may be performed by the HARQ component 1448 of FIG. 14. The HARQ feedback message based on receiving the first DL SPS transmission may correspond to the HARQ feedback message in the HARQ with CSI report on the PUCCH 606B/606N in FIG. 6, the HARQ message feedback in the HARQ with CSI report on the PUCCH 706B/706N in FIG. 7, the HARQ feedback message in the HARQ with CSI report on the PUCCH 806B/806C/806N in FIG. 8, the HARQ feedback message in the HARQ with CSI report on PUCCH 914A in FIG. 9 or the like. In some aspects, at 1110, the UE may further receive a second DL SPS transmission in a second PDSCH occasion that is not associated with the triggering information and transmit. In some aspects, the reception at 1110 may be performed by SPS component 1444. In some aspects, at 1112, the UE may further transmit a second HARQ feedback message, based on receiving the second DL SPS transmission, without transmitting a CSI report associated with the second DL SPS transmission based on the triggering information not being associated with the second DL SPS transmission in the second PDSCH occasion. In some aspects, the transmission at 1112 may be performed by the HARQ component 1448 of FIG. 14. The second HARQ feedback message without the CSI report may correspond to the HARQ feedback message in 606A/606C/606D/6060 in FIG. 6, the HARQ feedback message in 706A/706C/706D/7060 in FIG. 7, the HARQ feedback message in 806A/806C/806D/8060 in FIG. 8, the HARQ feedback message in 914B in FIG. 9, or the like.

Figure 12:
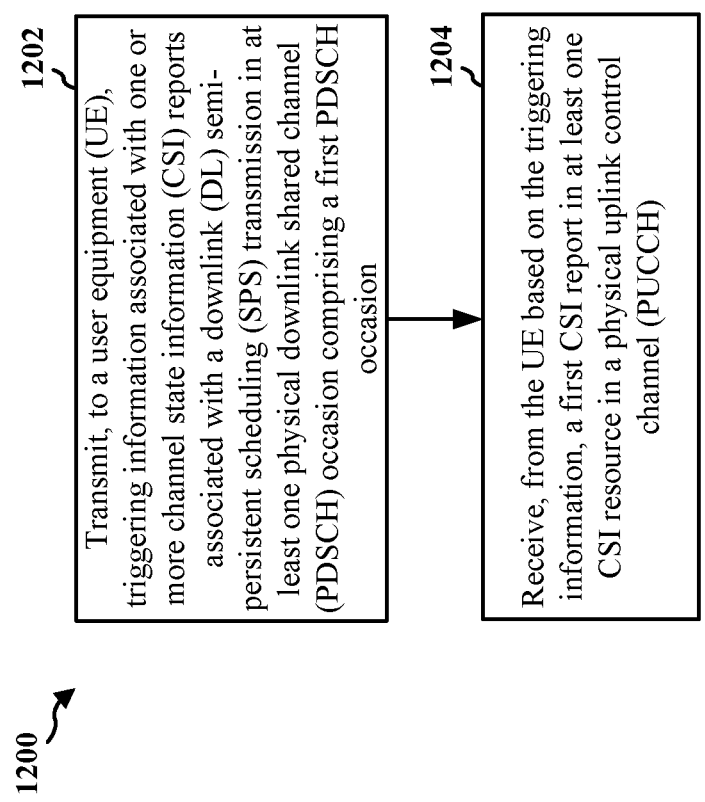
FIG. 12 is a flowchart of a method of wireless communication at a base station that supports triggering CSI report using DCI or DM-RS in accordance with various aspects of the present disclosure.

FIG. 12 is a flowchart 1200 of a method of wireless communication at a base station that supports triggering CSI report using DCI or DM-RS in accordance with various aspects of the present disclosure.

At 1202, the base station may transmit triggering information associated with one or more CSI reports associated with one or more DL SPS transmissions in one or more PDSCH occasions including a first PDSCH occasion to a UE. In some aspects, the transmission at 1202 may be performed by triggering component 1542 of FIG. 15. In some aspects, the triggering information may correspond to the DCI 604A/604D in FIG. 6, the DM-RS in DL SPS 702B/702N in FIG. 7, the DCI 804A/804D in FIG. 8, the trigger DCI 912 or the DM-RS in the DL SPS 910A in FIG. 9, or the like. In some aspects, the one or more DL SPS transmissions may correspond to DL SPS transmissions 602B/602N in FIG. 6, the DL SPS transmission 702B/702N in FIG. 7, the DL SPS 802B/802C/802N/8020 in FIG. 8, the DL SPS transmission 910A, or the like. In some aspects, the first PDSCH occasion may correspond to the DL SPS transmission 602B/602N in FIG. 6, the DL SPS transmission 702B/702N in FIG. 7, the DL SPS transmission 802B/802N in FIG. 8, the DL SPS transmission 910A, or the like. In some aspects, the UE may receive a second PDSCH occasion not associated with the trigger. For example, the second PDSCH occasion may correspond to the DL SPS transmission 602A/602C/602D/6020 in FIG. 6, the DL SPS transmission 702A/702C/702D/7020 in FIG. 7, the DL SPS transmission 802A/802D in FIG. 8, the DL SPS transmission 910B in FIG. 9, or the like.

In some aspects, the first PDSCH occasion includes a DM-RS and transmitting the triggering information may include transmitting the DM-RS. The DM-RS may trigger the UE to transmit the CSI report. For example, the DL SPS transmission 702B and 702N in FIG. 7 may correspond to the first PDSCH occasion that includes the DM-RS. In some aspects, the first DM-RS is a first type of DM-RS and the second PDSCH occasion includes a second DM-RS that is a second type of DM-RS different than the first type of DM-RS. For example, the trigger DM-RS in the DL SPS transmission 702B and 702N in FIG. 7 may correspond to the first DM-RS and DM-RS in DL SPS transmission 702A or the like may correspond to the second DM-RS. In some aspects, the first type of DM-RS corresponds to a first DM-RS sequence and the second type of DM-RS corresponds to a second DM-RS sequence different than the first DM-RS sequence. In some aspects, each of the even-numbered elements in the first DM-RS sequence has an opposite sign relative to the respective even-numbered element in the second DM-RS sequence or each of the odd-numbered elements in the first DM-RS sequence has an opposite sign relative to the respective odd-numbered element in the second DM-RS sequence. In some aspects, the first type of DM-RS corresponds to a first DM-RS sequence and the second type of DM-RS corresponds to a second DM-RS sequence, the first DM-RS sequence being different from the second DM-RS sequence. In some aspects, the first type of DM-RS may correspond to a first DM-RS pattern or a first DM-RS configuration and the second type of DM-RS corresponds to a second DM-RS pattern or a second DM-RS configuration. The first DM-RS pattern or the first DM-RS configuration may be different from the second DM-RS pattern or the second DM-RS configuration. The first DM-RS configuration and the second DM-RS configuration may correspond to at least one of a DM-RS location, a DM-RS allocation in time or frequency resources, a DM-RS ID, or a number of DM-RS symbols.

In some aspects, the first PDSCH occasion is associated with a DCI. Transmitting the triggering information may include transmitting the DCI. The DCI may be triggering a UE to transmit the CSI report or includes the trigger. For example, the first PDSCH occasion may correspond to DL SPS transmission 602B/602N in FIG. 6 and the DCI may correspond to DCI 604A/604D in FIG. 6. In some aspects, the triggering information is associated with an instruction to transmit the CSI report for one PDSCH occasion after the received PDSCH. In some aspects, the triggering information is associated with an instruction to transmit the CSI report for Each of X received PDSCH occasions including the first PDSCH occasion, where X≥1 and is configured via RRC, MAC-CE, or DCI. At 1004, the UE may transmit the CSI report based on the received trigger. In some aspects, the CSI report may be based on one or more of the PDSCH or a DM-RS. In some aspects, the CSI report includes one or more of a CQI, a MCS, a BLER, a BER, a next best RV, a channel rank, or an average received power. In some aspects, the base station may receive a HARQ feedback message including an ACK or an NACK for the first PDSCH occasion. The first HARQ feedback message for the first PDSCH occasion may correspond to the HARQ feedback message in HARQ with CSI report on the PUCCH 606B/606N in FIG. 6, the HARQ message feedback in HARQ with CSI report on PUCCH 706B/706N in FIG. 7, the HARQ feedback message in HARQ with CSI report on PUCCH 806B/806C/806N in FIG. 8, the HARQ feedback message in HARQ with CSI report on PUCCH 914A in FIG. 9 or the like. In some aspects, the base station may further receive a second HARQ feedback message, based on the second DL SPS transmission, without the CSI report for the second PDSCH occasion. The second HARQ feedback message without the CSI report may correspond to the HARQ feedback message in 606A/606C/606D/6060 in FIG. 6, the HARQ feedback message in 706A/706C/706D/7060 in FIG. 7, the HARQ feedback message in 806A/806C/806D/8060 in FIG. 8, the HARQ feedback message in 914B in FIG. 9, or the like.

At 1204, the base station may receive from the UE based on the triggering information, a first CSI report in a PUCCH. In some aspects, the CSI report may be based on one or more of the PDSCH or a DM-RS. In some aspects, the reception at 1204 may be performed by CSI component 1546 of FIG. 15. In some aspects, the CSI report includes one or more of a CQI, a MCS, a BLER, a BER, a next best RV, a channel rank, or an average received power. In some aspects, the CSI report may include a delta MCS or a reference MCS. A delta MCS may be a measured MCS minus scheduled MCS (e.g., MCS used for the PDSCH occasion transmission). A reference MCS may be the scheduled MCS. In some aspects, the base station may further receive a HARQ feedback message including an ACK or an NACK. The HARQ feedback message based on receiving the first PDSCH occasion may correspond to the HARQ feedback message in HARQ with CSI report on PUCCH 606B/606N in FIG. 6, the HARQ message feedback in HARQ with CSI report on PUCCH 706B/706N in FIG. 7, the HARQ feedback message in HARQ with CSI report on PUCCH 806B/806C/806N in FIG. 8, the HARQ feedback message in HARQ with CSI report on PUCCH 914A in FIG. 9 or the like. In some aspects, the base station may further receive a second HARQ feedback message, based on the second DL SPS transmission, without the CSI report. The second HARQ feedback message without the CSI report may correspond to the HARQ feedback message in 606A/606C/606D/6060 in FIG. 6, the HARQ feedback message in 706A/706C/706D/7060 in FIG. 7, the HARQ feedback message in 806A/806C/806D/8060 in FIG. 8, the HARQ feedback message in 914B in FIG. 9, or the like.

Figure 13:
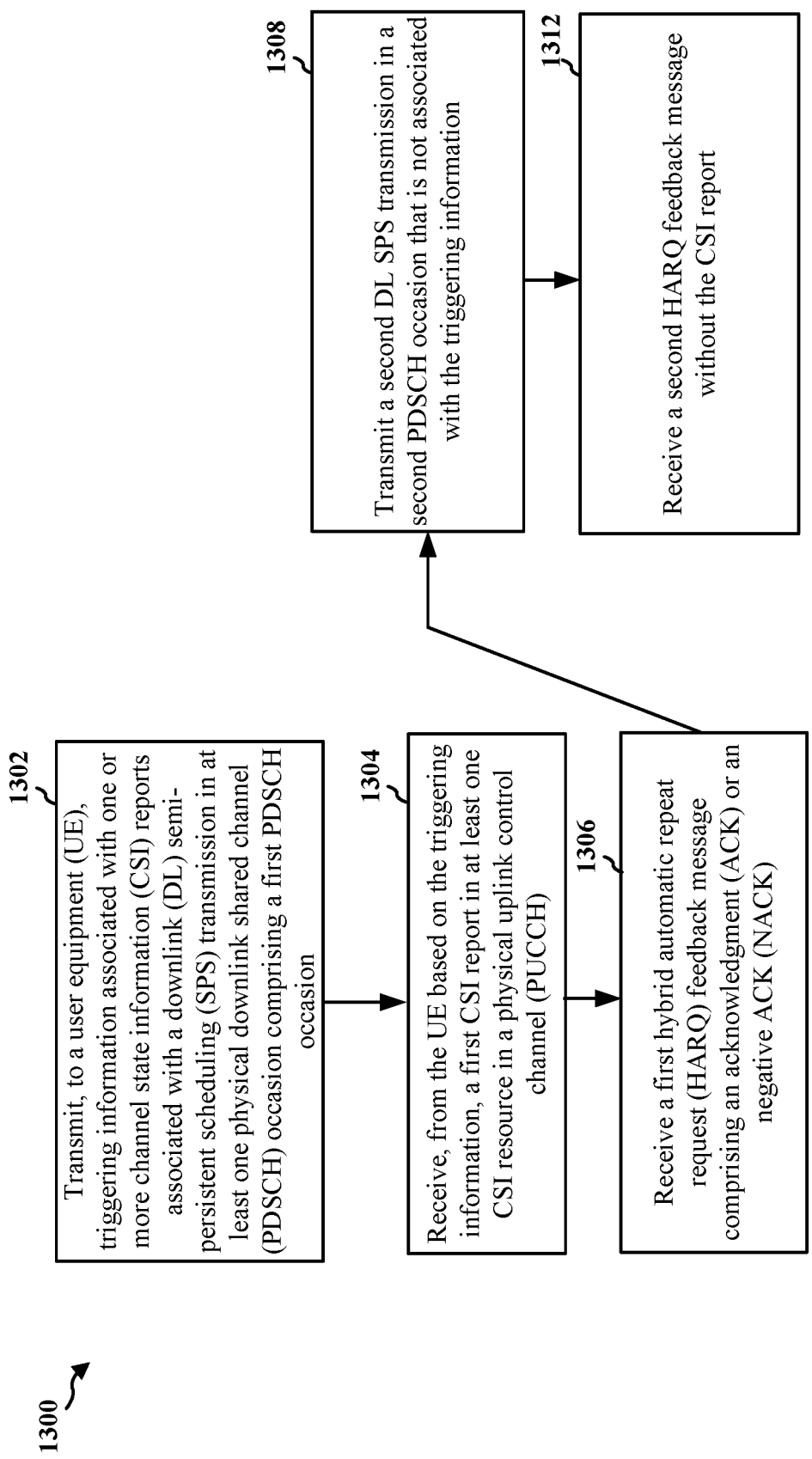
FIG. 13 is another flowchart of a method of wireless communication at a base station that supports triggering CSI report using DCI or DM-RS in accordance with various aspects of the present disclosure.

FIG. 13 is a flowchart 1300 of a method of wireless communication at a base station that supports triggering CSI report using DCI or DM-RS in accordance with various aspects of the present disclosure. The method may be performed by a base station, such as the base station 102/180, the base station 904, the apparatus 1502, or the like.

At 1302, the base station may transmit triggering information associated with one or more CSI reports associated with one or more DL SPS transmissions in one or more PDSCH occasions including a first PDSCH occasion to a UE. In some aspects, the transmission at 1302 may be performed by triggering component 1542 of FIG. 15 and the SP S component 1544 of FIG. 15. In some aspects, the triggering information may correspond to the DCI 604A/604D in FIG. 6, the DM-RS in DL SPS 702B/702N in FIG. 7, the DCI 804A/804D in FIG. 8, the trigger DCI 912 or the DM-RS in the DL SP S 910A in FIG. 9, or the like. In some aspects, the one or more DL SPS transmissions may correspond to DL SPS transmission 602B/602N in FIG. 6, the DL SPS transmission 702B/702N in FIG. 7, the DL SPS 802B/802C/802N/8020 in FIG. 8, the DL SPS transmission 910A, or the like. In some aspects, the first PDSCH occasion may correspond to the DL SPS transmission 602B/602N in FIG. 6, the DL SP S transmission 702B/702N in FIG. 7, the DL SP S transmission 802B/802N in FIG. 8, the DL SPS transmission 910A, or the like. In some aspects, at 1308, the base station may further transmit a second DL SPS transmission in a second PDSCH occasion that is not associated with the trigger. In some aspects, the transmission at 1308 may be performed by the SPS component 1544 of FIG. 15. For example, the second PDSCH occasion may correspond to the DL SPS transmission 602A/602C/602D/6020 in FIG. 6, the DL SPS transmission 702A/702C/702D/702O in FIG. 7, the DL SPS transmission 802A/802D in FIG. 8, the DL SPS transmission 910B in FIG. 9, or the like.

In some aspects, the first PDSCH occasion includes a DM-RS and transmitting the triggering information may include transmitting the DM-RS. The DM-RS may trigger the UE to transmit the CSI report. For example, the DL SPS transmission 702B and 702N in FIG. 7 may correspond to the first PDSCH occasion that includes the DM-RS. In some aspects, the first DM-RS is a first type of DM-RS and the second PDSCH occasion includes a second DM-RS that is a second type of DM-RS different than the first type of DM-RS. For example, the trigger DM-RS in the DL SPS transmission 702B and 702N in FIG. 7 may correspond to the first DM-RS and DM-RS in DL SPS transmission 702A or the like may correspond to the second DM-RS. In some aspects, the first type of DM-RS corresponds to a first DM-RS sequence and the second type of DM-RS corresponds to a second DM-RS sequence different than the first DM-RS sequence. In some aspects, each of the even-numbered elements in the first DM-RS sequence has an opposite sign relative to the respective even-numbered element in the second DM-RS sequence or each of the odd-numbered elements in the first DM-RS sequence has an opposite sign relative to the respective odd-numbered element in the second DM-RS sequence. In some aspects, the first type of DM-RS corresponds to a first DM-RS sequence and the second type of DM-RS corresponds to a second DM-RS sequence, the first DM-RS sequence being different from the second DM-RS sequence. In some aspects, the first type of DM-RS may correspond to a first DM-RS pattern or a first DM-RS configuration and the second type of DM-RS corresponds to a second DM-RS pattern or a second DM-RS configuration. The first DM-RS pattern or the first DM-RS configuration may be different from the second DM-RS pattern or the second DM-RS configuration. The first DM-RS configuration and the second DM-RS configuration may correspond to at least one of a DM-RS location, a DM-RS allocation in time or frequency resources, a DM-RS ID, or a number of DM-RS symbols.

In some aspects, the first PDSCH occasion is associated with a DCI. Transmitting the triggering information may include transmitting the DCI. The DCI may be triggering a UE to transmit the CSI report or includes the trigger. For example, the first PDSCH occasion may correspond to DL SPS transmission 602B/602N in FIG. 6 and the DCI may correspond to DCI 604A/604D in FIG. 6. In some aspects, the triggering information is associated with an instruction to transmit the CSI report for one PDSCH occasion after the received PDSCH. In some aspects, the triggering information is associated with an instruction to transmit the CSI report for Each of X received PDSCH occasions including the first PDSCH occasion, where X≥1 and is configured via RRC, MAC-CE, or DCI. At 1004, the UE may transmit the CSI report based on the received trigger. In some aspects, the CSI report may be based on one or more of the PDSCH or a DM-RS. In some aspects, the CSI report includes one or more of a CQI, a MCS, a BLER, a BER, a next best RV, a channel rank, or an average received power. In some aspects, at 1306, the base station may receive a HARQ feedback message including an ACK or an NACK for the first PDSCH occasion. In some aspects, the reception at 1306 may be performed by HARQ component 1548 of FIG. 15. The first HARQ feedback message for the first PDSCH occasion may correspond to the HARQ feedback message in HARQ with CSI report on the PUCCH 606B/606N in FIG. 6, the HARQ message feedback in HARQ with CSI report on PUCCH 706B/706N in FIG. 7, the HARQ feedback message in HARQ with CSI report on PUCCH 806B/806C/806N in FIG. 8, the HARQ feedback message in HARQ with CSI report on PUCCH 914A in FIG. 9 or the like. In some aspects, the base station may further receive a second HARQ feedback message, based on the second DL SPS transmission, without the CSI report for the second PDSCH occasion. The second HARQ feedback message without the CSI report may correspond to the HARQ feedback message in 606A/606C/606D/6060 in FIG. 6, the HARQ feedback message in 706A/706C/706D/7060 in FIG. 7, the HARQ feedback message in 806A/806C/806D/8060 in FIG. 8, the HARQ feedback message in 914B in FIG. 9, or the like.

At 1304, the base station may receive from the UE based on the triggering information, a first CSI report in a PUCCH. In some aspects, the CSI report may be based on one or more of the PDSCH or a DM-RS. In some aspects, the reception at 1304 may be performed by CSI component 1546 of FIG. 15. In some aspects, the CSI report includes one or more of a CQI, a MCS, a BLER, a BER, a next best RV, a channel rank, or an average received power. In some aspects, the CSI report may include a delta MCS or a reference MCS. A delta MCS may be a measured MCS minus scheduled MCS (e.g., MCS used for the PDSCH occasion transmission). A reference MCS may be the scheduled MCS. In some aspects, the base station may further receive a HARQ feedback message including an ACK or an NACK. The HARQ feedback message based on receiving the first PDSCH occasion may correspond to the HARQ feedback message in HARQ with CSI report on PUCCH 606B/606N in FIG. 6, the HARQ message feedback in HARQ with CSI report on PUCCH 706B/706N in FIG. 7, the HARQ feedback message in HARQ with CSI report on PUCCH 806B/806C/806N in FIG. 8, the HARQ feedback message in HARQ with CSI report on PUCCH 914A in FIG. 9 or the like. In some aspects, at 1312, the base station may further receive a second HARQ feedback message, based on the second DL SPS transmission, without the CSI report. In some aspects, the reception at 1312 may be performed by the HARQ component 1548 of FIG. 15. The second HARQ feedback message without the CSI report may correspond to the HARQ feedback message in 606A/606C/606D/6060 in FIG. 6, the HARQ feedback message in 706A/706C/706D/7060 in FIG. 7, the HARQ feedback message in 806A/806C/806D/8060 in FIG. 8, the HARQ feedback message in 914B in FIG. 9, or the like.

Figure 14:
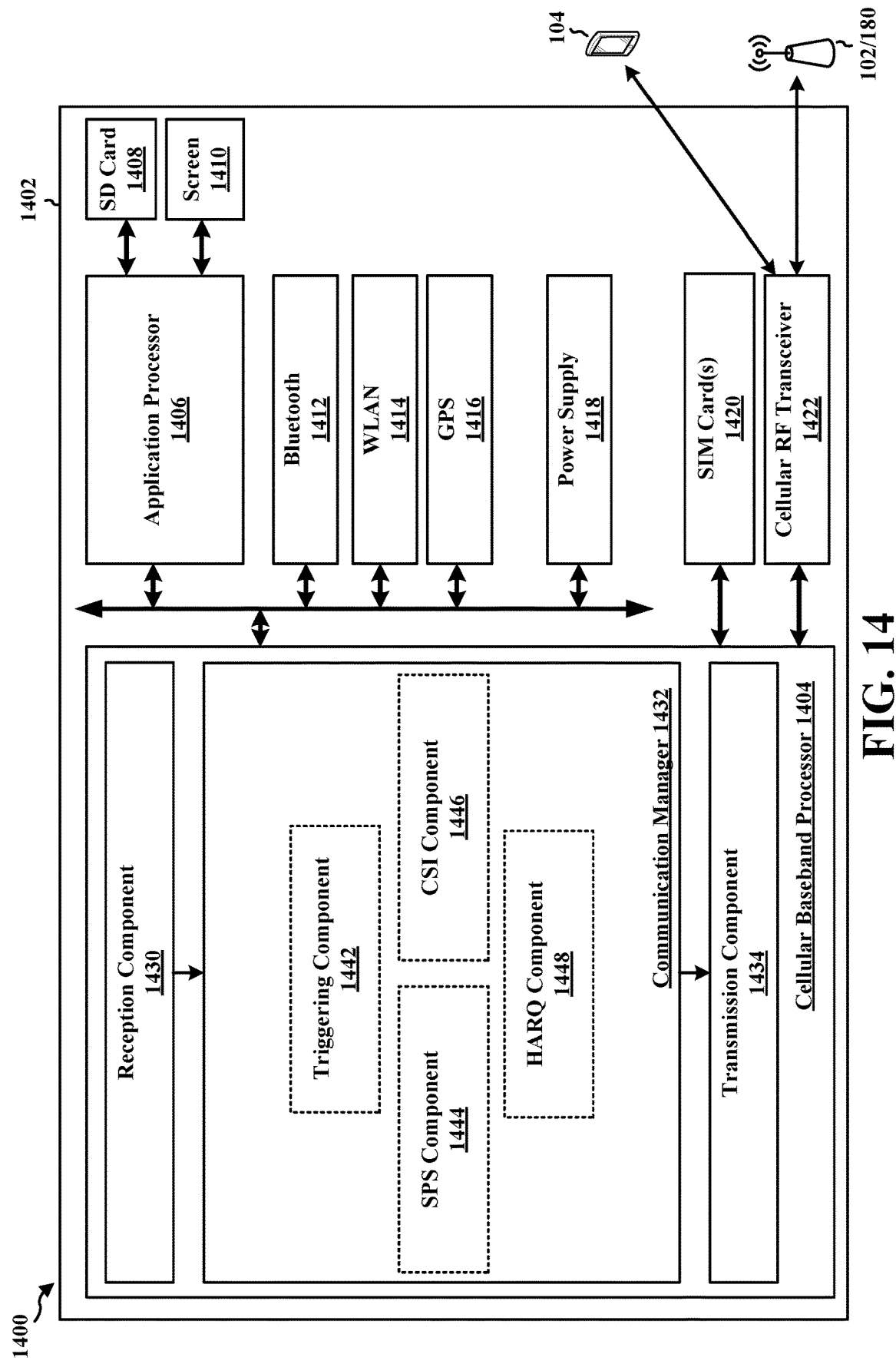
FIG. 14 is a diagram illustrating an example of a hardware implementation for an example apparatus at a UE.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GP S) module 1416, or a power supply 1418. The cellular baseband processor 1404 communicates through the cellular RF transceiver 1422 with the UE 104 or BS 102/180. The cellular baseband processor 1404 may include a computer-readable medium/ memory. The computer-readable medium/memory may be non-transitory. The cellular baseband processor 1404 is responsible for general processing, including the execution of software stored on the computer-readable medium/ memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory or configured as hardware within the cellular baseband processor 1404. The cellular baseband processor 1404 may be a component of the UE 350 and may include the memory 360 or at least one of the TX processor 368, the RX processor 356, and the controller/processor 359. In one configuration, the apparatus 1402 may be a modem chip and include just the cellular baseband processor 1404, and in another configuration, the apparatus 1402 may be the entire UE (for example, see 350 of FIG. 3) and include the additional modules of the apparatus 1402.

The communication manager 1432 may include a triggering component 1442 that is configured to receive triggering information associated with transmitting one or more CSI reports associated with one or more DL SPS transmissions in one or more PDSCH occasions, for example, as described in connection with 1102 of FIG. 11, or 1202 of FIG. 12. The communication manager 1432 may further include an SPS component 1444 that may be configured to receive a first DL SPS transmission of the one or more DL SPS transmissions in a first PDSCH occasion of the one or more PDSCH occasions or receive a second DL SPS transmission in a second PDSCH occasion that is not associated with the triggering information, for example, as described in connection with 1004 of FIG. 10, 1104 of FIG. 11, or 1110 of FIG. 11. The communication manager 1432 may further include a CSI component 1446 that may be configured to transmit a first CSI report associated with the first DL SPS transmission based on receiving the triggering information, for example, as described in connection with 1006 of FIG. 10, or 1106 of FIG. 11. The communication manager 1432 may further include a HARQ component 1448 that may be configured to transmit a first HARQ feedback message including an ACK or an NACK based on receiving the first DL SPS transmission or transmit a second HARQ feedback message, based on receiving the second DL SPS transmission, without transmitting a CSI report, for example, as described in connection with 1108 of FIG. 11, or 1112 of FIG. 11.

The apparatus may include additional components that perform each of the blocks of the algorithm in the flowcharts of FIGS. 10 and 11. As such, each block in the flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, may include means for receiving triggering information associated with transmitting one or more CSI reports associated with one or more DL SPS transmissions in one or more PDSCH occasions. The cellular baseband processor 1404 may further include means for receiving a first DL SPS transmission of the one or more DL SPS transmissions in a first PDSCH occasion of the one or more PDSCH occasions or receive a second DL SPS transmission in a second PDSCH occasion that is not associated with the triggering information. The cellular baseband processor 1404 may further include means for transmitting a first CSI report associated with the first DL SPS transmission based on receiving the triggering information. The cellular baseband processor 1404 may further include means for transmitting a first HARQ feedback message including an ACK or an NACK based on receiving the first DL SPS transmission. The cellular baseband processor 1404 may further include means for transmitting a second HARQ feedback message without transmitting a CSI report. The cellular baseband processor 1404 may further include means for generating the CSI report based on one or more of the PDSCH or a DM-RS. The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 15:
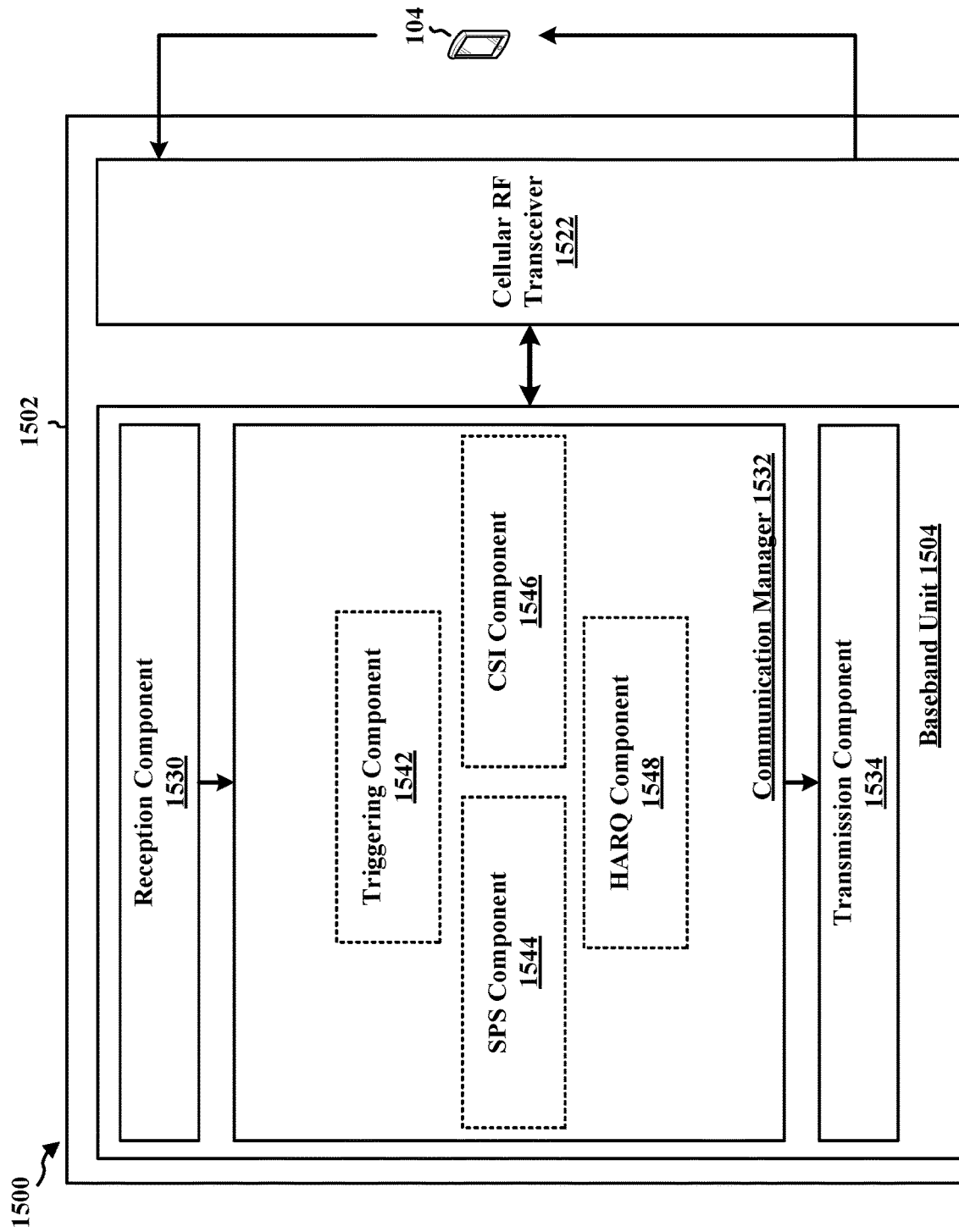
FIG. 15 is a diagram illustrating an example of a hardware implementation for an example apparatus at a base station.

FIG. 15 is a diagram 1500 illustrating an example of a hardware implementation for an apparatus 1502. The apparatus 1502 may be a base station, a component of a base station, or may implement base station functionality. In some aspects, the apparatus 1502 may include a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory or configured as hardware within the baseband unit 1504. The baseband unit 1504 may be a component of the base station 310 and may include the memory 376 or at least one of the TX processor 316, the RX processor 370, and the controller/processor 375.

The communication manager 1532 may include a component 1542 that is configured to transmit, to a UE, triggering information associated with one or more CSI reports associated with a DL SPS transmission in at least one PDSCH occasion including a first PDSCH occasion, for example, as described in connection with 1302 of FIG. 13, or 1202 of FIG. 12. The communication manager 1532 may further include an SPS component 1544 that may be configured to transmit a second DL SPS transmission in a second PDSCH occasion that is not associated with the triggering information, for example, as described in connection with 1308 of FIG. 13. The communication manager 1532 may further include a CSI component 1546 that may be configured to receive, from the UE based on the triggering information, the CSI report in at least one CSI resource in a PUCCH, for example, as described in connection with 1304 of FIG. 13. The communication manager 1532 may further include a HARQ component 1548 that may be configured to receive a first HARQ feedback message including an ACK or an NACK and receive a second HARQ feedback message, based on the second DL SPS transmission, without the CSI report, for example, as described in connection with 1306 and 1312 of FIG. 13.

The apparatus may include additional components that perform each of the blocks of the algorithm in the flowcharts of FIGS. 12-13. As such, each block in the flowcharts of FIGS. 12-13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, may include means for transmitting, to a UE, triggering information associated with one or more CSI reports associated with a DL SPS transmission in at least one PDSCH occasion including a first PDSCH occasion. The baseband unit 1504 may further include means for transmitting a second DL SPS transmission in a second PDSCH occasion that is not associated with the triggering information. The baseband unit 1504 may further include means for receiving, from the UE based on the triggering information, the CSI report in at least one CSI resource in a PUCCH. The baseband unit 1504 may further include means for receiving a first HARQ feedback message including an ACK or an NACK and means for receiving a second HARQ feedback message, based on the second DL SPS transmission, without the CSI report. The means may be one or more of the components of the apparatus 1502 configured to perform the functions recited by the means. As described supra, the apparatus 1502 may include the TX Processor 316, the RX Processor 370, and the controller/processor 375. As such, in one configuration, the means may be the TX Processor 316, the RX Processor 370, and the controller/processor 375 configured to perform the functions recited by the means.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person of ordinary skill in the art to practice the various aspects described herein. Various modifications to these aspects will be readily apparent to a person of ordinary skill in the art, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, for example, "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to a person having ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: receiving triggering information associated with transmitting one or more CSI reports associated with one or more DL SPS transmissions in one or more PDSCH occasions; receiving a first DL SPS transmission of the one or more DL SPS transmissions in a first PDSCH occasion of the one or more PDSCH occasions; and transmitting a first CSI report associated with the first DL SPS transmission based on receiving the triggering information.

Aspect 2 is the method of aspect 1, further comprising transmitting a first HARQ feedback message comprising an ACK or a NACK based on the receiving the first DL SPS transmission, wherein the first CSI report and the HARQ feedback message are transmitted in a same PUCCH.

Aspect 3 is the method of any of aspects 1-2, further comprising: receiving a second DL SPS transmission in a second PDSCH occasion that is not associated with the triggering information; and transmitting a second HARQ feedback message, based on receiving the second DL SPS transmission, without transmitting a CSI report associated with the second DL SPS transmission based on the triggering information not being associated with the second DL SPS transmission in the second PDSCH occasion.

Aspect 4 is the method of any of aspects 1-3, wherein the first PDSCH occasion includes a first DM-RS, and wherein receiving the triggering information comprises receiving the first DM-RS, the first DM-RS triggering the UE to transmit the first CSI report.

Aspect 5 is the method of any of aspects 1-4, wherein the first DM-RS is a first type of DM-RS, and wherein the second PDSCH occasion includes a second DM-RS that is a second type of DM-RS different than the first type of DM-RS.

Aspect 6 is the method of any of aspects 1-5, wherein the first type of DM-RS corresponds to a first DM-RS sequence and the second type of DM-RS corresponds to a second DM-RS sequence different than the first DM-RS sequence.

Aspect 7 is the method of any of aspects 1-6, wherein each of even-numbered elements in the first DM-RS sequence has an opposite sign relative to the respective even-numbered element in the second DM-RS sequence, wherein each of odd-numbered elements in the first DM-RS sequence has an opposite sign relative to the respective odd-numbered element in the second DM-RS sequence.

Aspect 8 is the method of any of aspects 1-7, wherein the first type of DM-RS corresponds to a first DM-RS pattern or a first DM-RS configuration and the second type of DM-RS corresponds to a second DM-RS pattern or a second DM-RS configuration different than the first DM-RS pattern or the first DM-RS configuration, respectively, wherein the first DM-RS configuration and the second DM-RS configuration correspond to at least one of a DM-RS location, a DM-RS allocation in time or frequency resources, a DM-RS scrambling ID, or a number of DM-RS symbols.

Aspect 9 is the method of any of aspects 1-8, wherein the first PDSCH occasion is associated with a DCI, and wherein receiving the triggering information comprises receiving the DCI, the DCI triggering the UE to transmit the first CSI report.

Aspect 10 is the method of any of aspects 1-9, wherein the triggering information activates the UE to transmit the first CSI report without transmitting a second CSI report.

Aspect 11 is the method of any of aspects 1-10, wherein the triggering information activates the UE to transmit a CSI report for each of X received PDSCH occasions including the first PDSCH occasion, where X≥1 and is configured via RRC signaling, a MAC-CE, or DCI.

Aspect 12 is the method of any of aspects 1-11, wherein the first CSI report comprises one or more of: a CQI, a MCS, a BLER, a BER, a next best RV, a channel rank, or an average received power.

Aspect 13 is a method of wireless communication at a base station, comprising: transmitting, to a UE, triggering information associated with one or more CSI reports associated with a DL SPS transmission in one or more PDSCH occasions comprising a first PDSCH occasion; and receiving, from the UE based on the triggering information, a first CSI report in a PUCCH.

Aspect 14 is the method of aspect 13, further comprising receiving a first HARQ feedback message comprising an ACK or an NACK.

Aspect 15 is the method of any of aspects 13-14, further comprising: transmitting a second DL SPS transmission in a second PDSCH occasion that is not associated with the triggering information; and receiving a second HARQ feedback message, based on the second DL SPS transmission, without the CSI report.

Aspect 16 is the method of any of aspects 13-15, wherein the first PDSCH occasion includes a first DM-RS, and wherein transmitting the triggering information comprises transmitting the first DM-RS, the first DM-RS triggering the UE to transmit the first CSI report.

Aspect 17 is the method of any of aspects 13-16, wherein the first DM-RS is a first type of DM-RS, and wherein the second PDSCH occasion includes a second DM-RS that is a second type of DM-RS different than the first type of DM-RS.

Aspect 18 is the method of any of aspects 13-17, wherein each of even-numbered elements in the first DM-RS sequence has an opposite sign relative to the respective even-numbered element in the second DM-RS sequence, wherein each of odd-numbered elements in the first DM-RS sequence has an opposite sign relative to the respective odd-numbered element in the second DM-RS sequence.

Aspect 19 is the method of any of aspects 13-18, wherein the first type of DM-RS corresponds to a first DM-RS pattern or a first DM-RS configuration and the second type of DM-RS corresponds to a second DM-RS pattern or a second DM-RS configuration different than the first DM-RS pattern or the first DM-RS configuration, respectively, wherein the first DM-RS configuration and the second DM-RS configuration correspond to at least one of a DM-RS location, a DM-RS allocation in time or frequency resources, a DM-RS scrambling ID, or a number of DM-RS symbols.

Aspect 20 is the method of any of aspects 13-19, wherein the first PDSCH occasion is associated with a DCI, and wherein transmitting the triggering information comprises transmitting the DCI.

Aspect 21 is the method of any of aspects 13-20, wherein the triggering information is associated with an instruction to transmit the first CSI report without transmitting a second CSI report.

Aspect 22 is the method of any of aspects 13-21, wherein the triggering information is associated with an instruction to transmit a CSI report for each of X PDSCH occasions including the first PDSCH occasion, where X≥1 and is configured via RRC signaling, a MAC-CE, or DCI.

Aspect 23 is the method of any of aspects 13-22, wherein the first CSI report comprises one or more of: a CQI, a MCS, a BLER, a BER, or a next best RV, a channel rank, or an average received power.

Aspect 24 is an apparatus for comprising a memory and at least one processor couple d to the memory and configured to perform any of aspects 1 to 12.

Aspect 25 is an apparatus for wireless communication including means for performing any of aspects 1 to 12.

Aspect 26 is a computer-readable medium storing computer executable code, where the code when executed by a processor causes the processor to perform any of aspects 1 to 12.

Aspect 27 is an apparatus for comprising a memory and at least one processor coupled to the memory and configured to perform any of aspects 13 to 23.

Aspect 28 is an apparatus for wireless communication including means for performing any of aspects 13 to 23.

Aspect 29 is a computer-readable medium storing computer executable code, where the code when executed by a processor causes the processor to perform any of aspects 13 to 23.

What is claimed is:

1. A method of wireless communication performed by a user equipment (UE), comprising:
    receiving triggering information associated with transmitting one or more channel state information (CSI) reports associated with one or more downlink (DL) semi-persistent scheduling (SPS) transmissions in one or more physical downlink shared channel (PDSCH) occasions;
    receiving a first DL SPS transmission of the one or more DL SPS transmissions in a first PDSCH occasion of the one or more PDSCH occasions, wherein the first PDSCH occasion includes a first demodulation reference signal (DM-RS) of a first type of DM-RS;
    transmitting a first CSI report associated with the first DL SPS transmission based on receiving the triggering information, wherein receiving the triggering information comprises receiving the first DM-RS, the first DM-RS triggering the UE to transmit the first CSI report; and
    receiving a second DL SPS transmission in a second PDSCH occasion that is not associated with the triggering information, wherein the second PDSCH occasion includes a second DM-RS that is a second type of DM-RS different than the first type of DM-RS.

2. The method of claim 1, further comprising transmitting a first hybrid automatic repeat request (HARQ) feedback message comprising an acknowledgment (ACK) or a negative ACK (NACK) based on the receiving the first DL SPS transmission, wherein the first CSI report and the HARQ feedback message are transmitted in a same physical uplink control channel (PUCCH).

3. The method of claim 2, further comprising:
    transmitting a second HARQ feedback message, based on receiving the second DL SPS transmission, without transmitting a CSI report associated with the second DL SPS transmission based on the triggering information not being associated with the second DL SPS transmission in the second PDSCH occasion.

4. The method of claim 1, wherein the first type of DM-RS corresponds to a first DM-RS sequence and the second type of DM-RS corresponds to a second DM-RS sequence different than the first DM-RS sequence.

5. The method of claim 4, wherein each of even-numbered elements in the first DM-RS sequence has an opposite sign relative to the respective even-numbered element in the second DM-RS sequence, wherein each of odd-numbered elements in the first DM-RS sequence has an opposite sign relative to the respective odd-numbered element in the second DM-RS sequence.

6. The method of claim 4, wherein the first type of DM-RS corresponds to a first DM-RS pattern or a first DM-RS configuration and the second type of DM-RS corresponds to a second DM-RS pattern or a second DM-RS configuration different than the first DM-RS pattern or the first DM-RS configuration, respectively, wherein the first DM-RS configuration and the second DM-RS configuration correspond to at least one of a DM-RS location, a DM-RS allocation in time or frequency resources, a DM-RS scrambling identifier (ID), or a number of DM-RS symbols.

7. The method of claim 1, wherein the first PDSCH occasion is associated with a downlink control information (DCI), and wherein receiving the triggering information comprises receiving the DCI, the DCI triggering the UE to transmit the first CSI report.

8. The method of claim 1, wherein the triggering information activates the UE to transmit the first CSI report without transmitting a second CSI report.

9. The method of claim 1, wherein the triggering information activates the UE to transmit a CSI report for each of X received PDSCH occasions including the first PDSCH occasion, where X≥1 and is configured via radio resource control (RRC) signaling, a medium access control (MAC) control element (MAC-CE), or downlink control information (DCI).

10. The method of claim 1, wherein the first CSI report comprises one or more of: a channel quality information (CQI), a modulation and coding scheme (MCS), a block error ratio (BLER), a bit error rate (BER), a next best redundancy version (RV), a channel rank, or an average received power.

11. A method of wireless communication performed by a base station, comprising:
  transmitting, to a user equipment (UE), triggering information associated with one or more channel state information (CSI) reports associated with a downlink (DL) semi-persistent scheduling (SPS) transmission in one or more physical downlink shared channel (PDSCH) occasions comprising a first PDSCH occasion, wherein the first PDSCH occasion includes a first demodulation reference signal (DM-RS) of a first type of DM-RS, and wherein transmitting the triggering information comprises transmitting the first DM-RS;
  transmitting a second DL SPS transmission in a second PDSCH occasion that is not associated with the triggering information, wherein the second PDSCH occasion includes a second DM-RS that is a second type of DM-RS different than the first type of DM-RS; and
  receiving, from the UE based on the triggering information, a first CSI report in a physical uplink control channel (PUCCH), the first DM-RS triggering the UE to transmit the first CSI report.

12. The method of claim 11, further comprising receiving a first hybrid automatic repeat request (HARQ) feedback message comprising an acknowledgment (ACK) or an negative ACK (NACK).

13. The method of claim 12, further comprising:
  receiving a second HARQ feedback message, based on the second DL SPS transmission, without the CSI report.

14. The method of claim 11, wherein each of even-numbered elements in the first DM-RS has an opposite sign relative to the respective even-numbered element in the second DM-RS, wherein each of odd-numbered elements in the first DM-RS has an opposite sign relative to the respective odd-numbered element in the second DM-RS.

15. The method of claim 11, wherein the first type of DM-RS corresponds to a first DM-RS pattern or a first DM-RS configuration and the second type of DM-RS corresponds to a second DM-RS pattern or a second DM-RS configuration different than the first DM-RS pattern or the first DM-RS configuration, respectively, wherein the first DM-RS configuration and the second DM-RS configuration correspond to at least one of a DM-RS location, a DM-RS allocation in time or frequency resources, a DM-RS scrambling identifier (ID), or a number of DM-RS symbols.

16. The method of claim 11, wherein the first PDSCH occasion is associated with a downlink control information (DCI), and wherein transmitting the triggering information comprises transmitting the DCI.

17. The method of claim 11, wherein the triggering information is associated with an instruction to transmit the first CSI report without transmitting a second CSI report.

18. The method of claim 11, wherein the triggering information is associated with an instruction to transmit a CSI report for each of X PDSCH occasions including the first PDSCH occasion, where X≥1 and is configured via radio resource control (RRC) signaling, a medium access control (MAC) control element (MAC-CE), or downlink control information (DCI).

19. The method of claim 11, wherein the first CSI report comprises one or more of: a channel quality information (CQI), a modulation and coding scheme (MCS), a block error ratio (BLER), a bit error rate (BER), or a next best redundancy version (RV), a channel rank, or an average received power.

20. An apparatus for wireless communication, comprising:
  a memory; and
  at least one processor coupled to the memory wherein the at least one processor is configured to:
    receive triggering information associated with transmission of one or more channel state information (CSI) reports associated with one or more downlink (DL) semi-persistent scheduling (SPS) transmissions in one or more physical downlink shared channel (PDSCH) occasions;
    receive a first DL SPS transmission of the one or more DL SPS transmissions in a first PDSCH occasion of the one or more PDSCH occasions, wherein the first PDSCH occasion includes a first demodulation reference signal (DM-RS) of a first type of DM-RS;
    transmit, based on the triggering information, a first CSI report associated with the first DL SPS transmission, wherein, to receive the triggering information, the at least one processor is configured to receive the first DM-RS; and
    receive a second DL SPS transmission in a second PDSCH occasion that is not associated with the triggering information, wherein the second PDSCH occasion includes a second DM-RS that is a second type of DM-RS different than the first type of DM-RS.

21. The apparatus of claim 20, further comprising a transceiver coupled to the at least one processor.

22. The apparatus of claim 20, wherein the triggering information is configured to activate the apparatus to transmit the first CSI report without causing the apparatus to transmit a second CSI report.

23. The apparatus of claim 20, wherein the triggering information is configured to activate the apparatus to transmit a CSI report for each of X received PDSCH occasions including the first PDSCH occasion, where X≥1 and is configured via radio resource control (RRC) signaling, a medium access control (MAC) control element (MAC-CE), or downlink control information (DCI).

24. The apparatus of claim 20, wherein the first CSI report comprises one or more of: a channel quality information (CQI), a modulation and coding scheme (MCS), a block error ratio (BLER), a bit error rate (BER), a next best redundancy version (RV), a channel rank, or an average received power.

25. An apparatus for wireless communication, comprising:
a memory; and
at least one processor coupled to the memory wherein the at least one processor is configured to:
transmit, to a user equipment (UE), triggering information associated with a channel state information (CSI) report associated with a downlink (DL) semi-persistent scheduling (SPS) transmission in one or more physical downlink shared channel (PDSCH) occasions comprising a first PDSCH occasion, wherein the first PDSCH occasion includes a first demodulation reference signal (DM-RS) of a first type of DM-RS, and wherein, to transmit the triggering information, the at least one processor is configured to transmit the first DM-RS;
transmit a second DL SPS transmission in a second PDSCH occasion that is not associated with the triggering information, wherein the second PDSCH occasion includes a second DM-RS that is a second type of DM-RS different than the first type of DM-RS; and
receive, from the UE based on the triggering information, a first CSI report in a physical uplink control channel (PUCCH), wherein the first DM-RS is configured to trigger the UE to transmit the first CSI report.

26. The apparatus of claim 25, further comprising a transceiver coupled to the at least one processor.

\* \* \* \* \*